US012599934B2

(12) United States Patent
Kumar et al.

(10) Patent No.: US 12,599,934 B2
(45) **Date of Patent: *Apr. 14, 2026**

(54) MULTIPLE STAGE SORTING

(71) Applicant: Sortera Technologies Inc., Markle, IN (US)

(72) Inventors: Nalin Kumar, Fort Wayne, IN (US); Manuel Gerardo Garcia, Jr., Austin, TX (US)

(73) Assignee: SORTERA TECHNOLOGIES, INC., Markle, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,134

(22) Filed: May 31, 2024

(65) Prior Publication Data

US 2024/0307923 A1 Sep. 19, 2024

Related U.S. Application Data

(60) Continuation of application No. 17/673,694, filed on Feb. 16, 2022, now Pat. No. 12,030,088, which is a continuation of application No. 17/491,415, filed on Sep. 30, 2021, now Pat. No. 11,278,937, which is a continuation-in-part of application No. 17/380,928, filed on Jul. 20, 2021, which is a continuation-in-part of application No. 17/227,245, filed on Apr. 9, 2021, (Continued)

(51) Int. Cl.

| | |
|---|---|
| ***B07C 5/04*** | (2006.01) |
| ***B07C 5/34*** | (2006.01) |
| ***B07C 5/342*** | (2006.01) |

(52) U.S. Cl.
CPC .............. *B07C 5/3422* (2013.01); *B07C 5/34* (2013.01); *B07C 5/342* (2013.01); *B07C 5/04* (2013.01); *B07C 2501/0054* (2013.01)

(58) Field of Classification Search
CPC .. B07C 5/04; B07C 5/34; B07C 5/342; B07C 5/3422; B07C 2501/0054
USPC .......................................................... 209/577
See application file for complete search history.

(56) References Cited

U.S. PATENT DOCUMENTS 2,194,381 A 3/1940 Cadman
2,417,878 A 3/1947 Luzietti et al.

(Continued)

FOREIGN PATENT DOCUMENTS

BR P10210794 3/2002
CA 2893877 12/2015

(Continued)

OTHER PUBLICATIONS

United States International Searching Authority; International Search Report & Written Opinion for PCT/US2022/035013; Sep. 23, 2022; 7 pages.

(Continued)

*Primary Examiner* — Terrell H Matthews
(74) *Attorney, Agent, or Firm* — Kelly Kordzik

(57) ABSTRACT

A material sorting system sorts materials utilizing multiple stages of classification and sorting, including a vision system that implements an artificial intelligence system in order to identify or classify each of the materials, and an x-ray fluorescence ("XRF") system or Laser Induced Breakdown Spectroscopy to perform a subsequent classification and sorting of the remaining materials.

15 Claims, 9 Drawing Sheets

Related U.S. Application Data now Pat. No. 11,964,304, which is a continuation-in-part of application No. 16/939,011, filed on Jul. 26, 2020, now Pat. No. 11,471,916, said application No. 17/491,415 is a continuation-in-part of application No. 16/852,514, filed on Apr. 19, 2020, now Pat. No. 11,260,426, said application No. 16/939,011 is a continuation of application No. 16/375,675, filed on Apr. 4, 2019, now Pat. No. 10,722,922, said application No. 16/852,514 is a division of application No. 16/358,374, filed on Mar. 19, 2019, now Pat. No. 10,625,304, said application No. 16/375,675 is a continuation-in-part of application No. 15/963,755, filed on Apr. 26, 2018, now Pat. No. 10,710,119, said application No. 16/358,374 is a continuation-in-part of application No. 15/963,755, filed on Apr. 26, 2018, now Pat. No. 10,710,119, which is a continuation-in-part of application No. 15/213,129, filed on Jul. 18, 2016, now Pat. No. 10,207,296.

(60) Provisional application No. 62/490,219, filed on Apr. 26, 2017, provisional application No. 62/193,332, filed on Jul. 16, 2015.

(56) References Cited

U.S. PATENT DOCUMENTS 2,942,792 A 6/1960 Anderson et al.
2,953,554 A 9/1960 Miller et al.
3,512,638 A 5/1970 Chengges et al.
3,662,874 A 5/1972 Muller
3,791,518 A 2/1974 Vanderhoof
3,955,678 A 5/1976 Moyer
3,973,736 A 8/1976 Nilsson
3,974,909 A 8/1976 Johnson
4,004,681 A 1/1977 Clewett et al.
4,031,998 A 6/1977 Suzuki et al.
4,044,897 A 8/1977 Maxted
4,253,154 A 2/1981 Russ et al.
4,317,521 A 3/1982 Clark et al.
4,413,721 A 11/1983 Bollier
4,488,610 A 12/1984 Yankloski
4,572,735 A 2/1986 Poetzschke et al.
4,586,613 A 5/1986 Horii
4,726,464 A 2/1988 Canziani
4,834,870 A 5/1989 Osterberg et al.
4,848,590 A 7/1989 Kelly
5,016,039 A * 5/1991 Sosa ..................... G03B 7/097 396/50
5,042,947 A 8/1991 Pötzschke et al.
5,054,601 A 10/1991 Sjogren et al.
5,114,230 A 5/1992 Pryor
5,236,092 A 8/1993 Krotkov et al.
5,260,576 A 11/1993 Sommer, Jr. et al.
5,410,637 A 4/1995 Kern et al.
5,433,311 A 7/1995 Bonnet
5,462,172 A 10/1995 Kumagai et al.
5,570,773 A 11/1996 Bonnet
5,663,997 A 9/1997 Willis et al.
5,676,256 A 10/1997 Kumar et al.
5,733,592 A 3/1998 Wettstein et al.
5,738,224 A 4/1998 Sommer, Jr. et al.
5,836,436 A 11/1998 Fortenbery et al.
5,911,327 A 6/1999 Tanaka et al.
6,012,659 A 1/2000 Nakazawa et al.
6,064,476 A 5/2000 Goltsos
6,076,653 A 6/2000 Bonnet
6,100,487 A 8/2000 Schultz et al.
6,124,560 A * 9/2000 Roos ...................... B07C 5/361 209/587
6,148,990 A 11/2000 Lapeyre et al.
6,266,390 B1 7/2001 Sommer, Jr. et al.
6,273,268 B1 8/2001 Axmann
6,313,422 B1 11/2001 Anibas
6,313,423 B1 * 11/2001 Sommer ................ B07C 5/366 209/579
6,412,642 B2 7/2002 Charles et al.
6,421,042 B1 * 7/2002 Omura ............... G06F 3/04842 345/157
6,457,859 B1 10/2002 Lu et al.
6,519,315 B2 2/2003 Sommer, Jr. et al.
6,545,240 B2 4/2003 Kumar
6,795,179 B2 9/2004 Kumar
6,888,917 B2 5/2005 Sommer, Jr. et al.
6,983,035 B2 1/2006 Price et al.
7,073,651 B2 7/2006 Costanzo et al.
7,099,433 B2 8/2006 Sommer et al.
7,200,200 B2 4/2007 Laurila et al.
7,341,154 B2 3/2008 Boer
7,564,943 B2 7/2009 Sommer, Jr. et al.
7,616,733 B2 11/2009 Sommer et al.
7,674,994 B1 3/2010 Valerio
7,763,820 B1 7/2010 Sommer, Jr. et al.
7,802,685 B2 9/2010 Allen
7,848,484 B2 12/2010 Sommer, Jr. et al.
7,886,915 B2 2/2011 Shulman
7,903,789 B2 3/2011 Morton et al.
7,978,814 B2 7/2011 Sommer et al.
7,991,109 B2 8/2011 Golenhofen
8,073,099 B2 12/2011 Niu et al.
8,144,831 B2 3/2012 Sommer, Jr. et al.
8,172,069 B2 5/2012 Prakasam
8,429,103 B1 4/2013 Aradhye et al.
8,433,121 B2 4/2013 Kosarev
8,476,545 B2 7/2013 Sommer et al.
8,553,838 B2 10/2013 Sommer et al.
8,567,587 B2 10/2013 Faist et al.
8,576,988 B2 11/2013 Lewalter et al.
8,600,545 B2 12/2013 Earlam
8,615,123 B2 * 12/2013 Dabic ................... G07D 5/005 382/136
8,654,919 B2 2/2014 Sabol et al.
8,855,809 B2 10/2014 Spencer et al.
8,903,040 B2 12/2014 Maeyama et al.
9,156,162 B2 10/2015 Suzuki et al.
9,316,596 B2 4/2016 Levesque
9,424,635 B2 8/2016 Killmann
9,514,590 B2 12/2016 Lindbichler
9,785,851 B1 10/2017 Torek et al.
9,927,354 B1 * 3/2018 Starr ................. G01N 21/3581
9,956,609 B1 5/2018 De Saro
10,005,107 B2 6/2018 Ogusu
10,036,142 B2 * 7/2018 Bamber ................... B07C 5/34
10,088,425 B2 10/2018 Buckley et al.
10,207,296 B2 * 2/2019 Garcia ..................... B07C 5/34
10,295,451 B2 5/2019 Schneider
10,467,477 B2 11/2019 Gershtein
10,478,861 B2 11/2019 Comtois et al.
10,486,209 B2 11/2019 Wimmer
10,625,304 B2 * 4/2020 Kumar ................. G06T 7/0006
10,710,119 B2 * 7/2020 Kumar ................. B07C 5/3416
10,722,922 B2 * 7/2020 Kumar ..................... B07C 5/34
10,799,915 B2 10/2020 Horowitz
10,824,936 B2 11/2020 Wu
10,967,404 B2 4/2021 Grof
11,278,937 B2 * 3/2022 Kumar ..................... B07C 5/34
11,964,304 B2 * 4/2024 Kumar ................... B07C 5/342
12,246,355 B2 * 3/2025 Kumar ..................... B07C 5/34
2002/0186882 A1 12/2002 Cotman
2003/0038064 A1 2/2003 Harbeck et al.
2003/0147494 A1 8/2003 Sommer, Jr. et al.
2004/0151364 A1 8/2004 Kenneway et al.
2004/0232597 A1 11/2004 Smith
2006/0239401 A1 10/2006 Sommer, Jr. et al.
2007/0029232 A1 * 2/2007 Cowling .............. B07C 5/3425 209/577
2007/0262000 A1 11/2007 Valerio
2008/0029445 A1 2/2008 Russcher et al.
2008/0041501 A1 2/2008 Platek
2008/0092922 A1 4/2008 Dick
2008/0257795 A1 10/2008 Shuttleworth
2008/0302707 A1 12/2008 Bourely

(56) References Cited

U.S. PATENT DOCUMENTS

| | | | | |
|---|---|---|---|---|
| 2009/0292422 | A1 | 11/2009 | Eisworth et al. | |
| 2010/0017020 | A1* | 1/2010 | Hubbard-Nelson | B07C 5/346 700/230 |
| 2010/0091272 | A1 | 4/2010 | Asada et al. | |
| 2010/0195795 | A1 | 8/2010 | Golenhofen | |
| 2010/0264070 | A1 | 10/2010 | Sommer, Jr. et al. | |
| 2010/0282646 | A1 | 11/2010 | Looy et al. | |
| 2011/0017644 | A1 | 1/2011 | Valerio | |
| 2011/0083871 | A1 | 4/2011 | Lalancette et al. | |
| 2011/0247730 | A1* | 10/2011 | Yanar | B22D 21/007 148/552 |
| 2012/0148018 | A1 | 6/2012 | Sommer, Jr. et al. | |
| 2012/0288058 | A1 | 11/2012 | Maeyama et al. | |
| 2013/0028487 | A1 | 1/2013 | Stager et al. | |
| 2013/0079918 | A1 | 3/2013 | Spencer et al. | |
| 2013/0092609 | A1 | 4/2013 | Andersen | |
| 2013/0126399 | A1 | 5/2013 | Wolff et al. | |
| 2013/0184853 | A1* | 7/2013 | Roos | B07C 5/346 378/53 |
| 2013/0229510 | A1 | 9/2013 | Killmann | |
| 2013/0264249 | A1 | 10/2013 | Sommer, Jr. et al. | |
| 2013/0304254 | A1* | 11/2013 | Torek | B07C 5/3416 700/223 |
| 2015/0012226 | A1* | 1/2015 | Skaff | G01N 21/55 702/22 |
| 2015/0050548 | A1 | 2/2015 | Meissner | |
| 2015/0092922 | A1 | 4/2015 | Liu et al. | |
| 2015/0170024 | A1 | 6/2015 | Chatterjee et al. | |
| 2015/0254532 | A1 | 9/2015 | Talathi et al. | |
| 2015/0336135 | A1 | 11/2015 | Corak | |
| 2016/0016201 | A1* | 1/2016 | Schons | B07B 1/14 209/658 |
| 2016/0022892 | A1 | 1/2016 | Eifler et al. | |
| 2016/0059450 | A1 | 3/2016 | Meredith | |
| 2016/0066860 | A1 | 3/2016 | Sternickel | |
| 2016/0136694 | A1* | 5/2016 | Janda | G01N 15/1434 209/576 |
| 2016/0250665 | A1 | 9/2016 | Lampe | |
| 2016/0299091 | A1 | 10/2016 | Bamber et al. | |
| 2016/0346811 | A1 | 12/2016 | Iino | |
| 2017/0014868 | A1 | 1/2017 | Garcia, Jr. et al. | |
| 2017/0232479 | A1* | 8/2017 | Pietzka | B07C 5/342 209/3.3 |
| 2017/0261437 | A1 | 9/2017 | Buchter | |
| 2018/0065155 | A1 | 3/2018 | Ripley | |
| 2018/0243800 | A1* | 8/2018 | Kumar | G06N 3/0464 |
| 2019/0091729 | A1 | 3/2019 | Gillner | |
| 2019/0130560 | A1 | 5/2019 | Horowitz | |
| 2019/0210067 | A1 | 7/2019 | Sortera | |
| 2019/0247891 | A1 | 8/2019 | Sortera | |
| 2019/0299255 | A1* | 10/2019 | Chaganti | G06F 18/2431 |
| 2020/0034661 | A1 | 1/2020 | Kim | |
| 2020/0050922 | A1 | 2/2020 | Wu et al. | |
| 2020/0084966 | A1 | 3/2020 | Corban et al. | |
| 2020/0290088 | A1 | 9/2020 | Sortera | |
| 2020/0361659 | A1 | 11/2020 | Whitman et al. | |
| 2020/0368786 | A1 | 11/2020 | Kumar et al. | |
| 2021/0001377 | A1 | 1/2021 | Sutton | |
| 2021/0094075 | A1 | 4/2021 | Horowitz et al. | |
| 2021/0217156 | A1 | 7/2021 | Balachandran et al. | |
| 2021/0229133 | A1 | 7/2021 | Kumar et al. | |
| 2021/0346916 | A1 | 11/2021 | Kumar et al. | |
| 2022/0016675 | A1 | 1/2022 | Sortera | |
| 2022/0023918 | A1 | 1/2022 | Sortera | |
| 2022/0161298 | A1 | 5/2022 | Sortera | |
| 2022/0168781 | A1 | 6/2022 | Sortera | |
| 2022/0203407 | A1 | 6/2022 | Sortera | |
| 2022/0245402 | A1 | 8/2022 | Tae | |
| 2022/0355342 | A1 | 11/2022 | Sortera | |
| 2022/0371057 | A1 | 11/2022 | Sortera | |
| 2023/0011383 | A1 | 1/2023 | Balthasar | |
| 2023/0044783 | A1 | 2/2023 | Sortera | |
| 2023/0053268 | A1 | 2/2023 | Sortera | |
| 2023/0169751 | A1 | 6/2023 | Geurts | |
| 2023/0173543 | A1 | 6/2023 | Sortera | |
| 2023/0176028 | A1 | 6/2023 | Sortera | |
| 2024/0109103 | A1 | 4/2024 | Sortera | |
| 2024/0116084 | A1 | 4/2024 | Gagliardi | |
| 2024/0149304 | A1 | 5/2024 | Sortera | |
| 2024/0228180 | A9 | 7/2024 | Sortera | |
| 2024/0228181 | A9 | 7/2024 | Sortera | |

FOREIGN PATENT DOCUMENTS

| | | | | |
|---|---|---|---|---|
| CA | 3065962 | A1 * | 6/2020 | B07C 5/342 |
| CN | 1283319 | | 2/2001 | |
| CN | 200953004 | | 9/2007 | |
| CN | 201440132 | | 4/2010 | |
| CN | 201464390 | | 5/2010 | |
| CN | 101776620 | A | 7/2010 | |
| CN | 201552461 | | 7/2010 | |
| CN | 102861722 | | 1/2013 | |
| CN | 103501925 | | 1/2014 | |
| CN | 103745901 | | 4/2014 | |
| CN | 101776620 | B | 6/2014 | |
| CN | 103955707 | | 7/2014 | |
| CN | 203688493 | | 7/2014 | |
| CN | 204359695 | | 5/2015 | |
| CN | 204470139 | | 7/2015 | |
| CN | 204495749 | | 7/2015 | |
| CN | 204537711 | | 8/2015 | |
| CN | 204575572 | | 8/2015 | |
| CN | 104969266 | | 10/2015 | |
| CN | 106000904 | | 10/2016 | |
| CN | 107403198 | | 11/2017 | |
| CN | 107552412 | | 1/2018 | |
| CN | 107552412 | A * | 1/2018 | B07C 5/342 |
| CN | 107790398 | | 3/2018 | |
| CN | 111659635 | | 9/2020 | |
| CN | 211888005 | U | 11/2020 | |
| DE | 202009006383 | | 9/2009 | |
| EP | 0011892 | | 11/1983 | |
| EP | 0074447 | | 1/1987 | |
| EP | 0433828 | A2 | 12/1990 | |
| EP | 0351778 | B1 | 10/1993 | |
| EP | 2243089 | A1 | 10/2010 | |
| EP | 3263234 | | 1/2018 | |
| JP | H07-275802 | | 10/1995 | |
| JP | 2010-172799 | | 8/2010 | |
| JP | 5083196 | | 11/2012 | |
| JP | 2015-512075 | | 4/2015 | |
| JP | 5969685 | | 7/2016 | |
| JP | 2017-109197 | | 6/2017 | |
| JP | 2021163078 | | 10/2021 | |
| KR | 20090106056 | | 10/2009 | |
| RU | 2004101401 | | 2/2005 | |
| RU | 2006136756 | | 4/2008 | |
| RU | 2339974 | | 11/2008 | |
| RU | 2361194 | | 7/2009 | |
| TW | I707812 | | 10/2020 | |
| WO | WO2001/022072 | | 3/2001 | |
| WO | WO2009/039284 | | 3/2009 | |
| WO | WO2011/159269 | | 12/2011 | |
| WO | WO2012/094568 | | 7/2012 | |
| WO | WO2013/033572 | | 3/2013 | |
| WO | WO2013/180922 | | 12/2013 | |
| WO | WO2015/195988 | | 12/2015 | |
| WO | WO2016/199074 | | 12/2016 | |
| WO | WO2017/001438 | | 1/2017 | |
| WO | WO2017/011835 | | 1/2017 | |
| WO | WO-2017011835 | A1 * | 1/2017 | G01N 23/223 |
| WO | 2017221246 | | 12/2017 | |
| WO | WO2018/091617 | | 5/2018 | |
| WO | WO-2019241114 | A1 * | 12/2019 | B07C 5/3422 |
| WO | WO2021/089602 | | 5/2021 | |
| WO | WO2021/126876 | | 6/2021 | |
| WO | WO-2021126876 | A1 * | 6/2021 | B65G 47/918 |

(56) References Cited

FOREIGN PATENT DOCUMENTS

| | | |
|---|---|---|
| WO | WO2019/180438 | 9/2022 |
| WO | WO2023/137423 | 7/2023 |

OTHER PUBLICATIONS

Mach Vision New High Technology Equipment—Machinex, Jun. 8, 2021, downloaded from https://www.machinexrecycling.com/news/mach-vision-new-high-technology-equipment/, 1 page.
BHS and NRT Introduce Max-AI™; Bulk Handling Systems (BHS); Apr. 18, 2017; downloaded from https://max-ai.com/autonomous-qc/ on Apr. 18, 2024.
Gao et al., "Applying Improved Optical Recognition with Machine Learning on Sorting Cu Impurities in Steel Scrap," Journal of Sustainable Metallurgy, vol. 6, pp. 785-795, Dec. 7, 2020.
United States International Searching Authority; International Search Report & Written Opinion for PCT/US2022/030943; Sep. 28, 2022; 10 pages; Alexandria, VA.
The United States Patent and Trademark Office, Non-Final Office Action, U.S. Appl. No. 16/358,374, Jun. 28, 2019.
The United States Patent and Trademark Office, Non-Final Office Action, U.S. Appl. No. 16/358,374, Dec. 12, 2019.
The United States Patent and Trademark Office, Non-Final Office Action, U.S. Appl. No. 15/963,755, Apr. 5, 2019.
The United States Patent and Trademark Office, Non-Final Office Action, U.S. Appl. No. 15/963,755, Sep. 13, 2019.
The United States Patent and Trademark Office, Non-Final Office Action, U.S. Appl. No. 15/963,755, May 11, 2020.
The United States Patent and Trademark Office, Non-Final Office Action, U.S. Appl. No. 17/491,415, Nov. 15, 2021.
The United States Patent and Trademark Office, Non-Final Office Action, U.S. Appl. No. 17/673,694, Jan. 25, 2024.
The United States Patent and Trademark Office, Non-Final Office Action, U.S. Appl. No. 17/696,831, Mar. 29, 2024.
The United States Patent and Trademark Office, Non-Final Office Action, U.S. Appl. No. 17/495,291, Oct. 27, 2023.
The United States Patent and Trademark Office, Non-Final Office Action, U.S. Appl. No. 17/972,507, Jun. 20, 2024.
United States International Searching Authority; International Search Report & Written Opinion for PCT/US2024/017756; Jun. 17, 2024; 12 pages.
United States International Searching Authority; International Search Report & Written Opinion for PCT/US2024/017762; Jun. 17, 2024; 15 pages.
United States International Searching Authority; International Search Report & Written Opinion for PCT/US2023/077485; Feb. 21, 2024; 9 pages.
Taiwan Patent Office; Office Action dated Jun. 5, 2024 for Serial No. 111107059; 25 pages (with translation).
"Alloy Data: Aluminum Die Casting Alloys," MES, Inc., 4 pages, downloaded from the internet Mar. 28, 2019, www.mesinc.com.
A. Lee, "Comparing Deep Neural Networks and Traditional Vision Algorithms in Mobile Robotics," Swarthmore College, 9 pages, downloaded from Internet on May 1, 2018.
B. Shaw, "Applicability of total reflection X-ray fluorescence (TXRF) as a screening platform for pharmaceutical inorganic impurity analysis," Journal of Pharmaceutical and Biomedical Analysis, vol. 63, 2012, pp. 151-159.
Bishop, Christopher M.; Neural Networks for Pattern Recognition; 494 pages; Clarendon Press; 1995; Oxford, UK.
Briefing Elemental Impurities-Limits, Revision Bulletin, The United States Pharmacopeial Convention, Feb. 1, 2013, 3 pages.
C. K. Lowe et al., "Data Mining With Different Types of X-Ray Data," JCPDS—International Centre for Diffraction Data 2006, ISSN 1097-0002, pp. 315-321.
C.O. Augustin et al., "Removal of Magnesium from Aluminum Scrap and Aluminum-Magnesium Alloys," Bulletin of Electrochemistry 2(6), Nov.-Dec. 1986; pp. 619-620.
Chapter 6, Functional Description, S2 Picofox User Manual, 2008, pp. 45-64.
Chinese Patent Office; Office Action issued for corresponding Chinese Application No. 201980043725.X on Apr. 28, 2022; 21 pages; Beijing, CN.
D. Bradley, "Pharmaceutical toxicity: AAS and other techniques measure pharma heavy metal," Ezine, May 15, 2011, 2 pages.
E. Margui et al., "Determination of metal residues in active pharmaceutical ingredients according to European current legislation by using X-ray fluorescence spectrometry," J. Anal. At. Spectrom., Jun. 16, 2009, vol. 24, pp. 1253-1257.
E.A. Vieira et al., "Use of Chlorine to Remove Magnesium from Molten Aluminum," Materials Transactions, vol. 53, No. 3, pp. 477-482, Feb. 25, 2012.
Elemental Impurity Analysis In Regulated Pharmaceutical Laboratories, A Primer, Agilent Technologies, Jul. 3, 2012, 43 pages.
European Patent Office; Extended European Search Report for corresponding EP 19792330.3; Apr. 30, 2021; 7 pages; Munich, DE.
European Patent Office; Extended Search Report for 16825313.6; Jan. 28, 2019; 12 pages; Munich, DE.
Exova, X-ray fluorescence: a new dimension to elemental analysis, downloaded from www.exova.com on Jul. 26, 2016, 3 pages.
G. O'Neil, "Direct Identification and Analysis of Heavy Metals in Solution (Hg, Cu, Pb, Zn, Ni) by Use of in Situ Electrochemical X-ray Fluorescence," Analytical Chemistry, Feb. 2015, 22 pages.
Guideline for Elemental Impurities, Q3D, International Conference on Harmonisation of Technical Requirements For Registration of Pharmaceuticals for Human Use, ICH Harmonised Guideline, Current Step 4 version, Dec. 16, 2014, 77 pages.
H. Rebiere et al., "Contribution of X-Ray Fluorescence Spectrometry For The Analysis Of Falsified Products," ANSM, The French National Agency for Medicines and Health Products Safety, Laboratory Controls Division, France, 1 page, (date unknown).
India Patent Office; Office Action issued for corresponding India Application Serial No. 201937044046; Jun. 4, 2020; 7 pages; IN.
India Patent Office; Office Action issued for corresponding India Application Serial No. 201817002365; Mar. 12, 2020; 6 pages; IN.
The Aluminum Association, Inc., International Alloy Designations and Chemical Composition Limits for Wrought Aluminum and Wrought Aluminum Alloys, revised Jan. 2015, 38 pages.
International Searching Authority, International Search Report and the Written Opinion, International Application No. PCT/US2016/042850, Sep. 28, 2016.
International Searching Authority, International Search Report and the Written Opinion, International Application No. PCT/US2018/029640, Jul. 23, 2018; 23 pages; Alexandria, VA; US.
International Searching Authority, International Search Report and the Written Opinion, International Application No. PCT/US2019/022995, Jun. 5, 2019; 10 pages; Alexandria, VA; US.
International Searching Authority, International Search Report and The Written Opinion of the International Searching Authority, International Application No. PCT/US2016/45349, Oct. 17, 2016.
J. Mccomb et al., "Rapid screening of heavy metals and trace elements in environmental samples using portable X-ray fluorescence spectrometer, A comparative study," Water Air Soil Pollut., Dec. 2014, vol. 225, No. 12, pp. 1-16.
J. Mondia, "Using X-ray fluorescence to measure inorganics in biopharmaceutical raw materials," Anal. Methods, Mar. 18, 2015, vol. 7, pp. 3545-3550.
J. Schmidhuber et al., "Deep Learning in Neural Networks: An Overview," The Swiss AI Lab IDSIA, Technical Report IDSIA-03-14/arXiv:1404.7828 v4 [cs.NE], Oct. 8, 2014, 88 pages.
Japan Patent Office; Office Action issued Jan. 10, 2023 for Serial No. 2021-509947; 9 pages (with translation).
Jones et al., "Safe Steering Wheel Airbag Removal Using Active Disassemly":, Ds 30; Proceedings of Design 2002, the 7th International Design Converence, dubrovnik, Retrieved on Jul. 10, 2022, from <https://desigsociety.org/publiatio/29632/Safe+Steering+Wheel+Airbag+Removal+Using+Active+Dissembly>.
K. Tarbell et al., "Applying Machine Learning to the Sorting of Recyclable Containers," University of Illinois at Urbana-Champaign, Urbana, Illinois, 7 pages, downloaded from Internet on May 1, 2018.

(56) References Cited

OTHER PUBLICATIONS

L. Goncalves, "Assessment of metal elements in final drug products by wavelength dispersive X-ray fluorescence spectrometry," Anal. Methods, May 19, 2011, vol. 3, pp. 1468-1470.
L. Hutton, "Electrochemical X-ray Fluorescence Spectroscopy for Trace Heavy Metal Analysis: Enhancing X-ray Fluorescence Detection Capabilities by Four Orders of Magnitude," Analytical Chemistry, Apr. 4, 2014, vol. 86, pp. 4566-4572.
L. Moens et al., Chapter 4, X-Ray Fluorescence, Modern Analytical Methods in Art and Archaeology, Chemical Analysis Series, vol. 155, pp. 55-79, copyright 2000.
M. Baudelet et al., "The first years of laser-induced breakdown spectroscopy," J. Anal. At. Spectrom., Mar. 27, 2013, 6 pages.
M. Razzak et al., "Deep Learning for Medical Image Processing: Overview, Challenges and Future," 30 pages, downloaded from Internet on May 1, 2018.
M. Singh et al., "Transforming Sensor Data to the Image Domain for Deep Learning—an Application to Footstep Detection," International Joint Conference on Neural Networks, Anchorage, Alaska, 8 pages, May 14-19, 2017.
P. R. Schwoebel et al., "Studies of a prototype linear stationary x-ray source for tomosynthesis imaging," Phys. Med Biol. 59, pp. 2393-2413, Apr. 17, 2014.
R. Sitko et al., "Quantification in X-Ray Fluorescence Spectrometry," X-Ray Spectroscopy, Dr. Shatendra K Sharma (Ed.), ISBN: 978-953-307-967-7, InTech, 2012, pp. 137-163; Available from: http://www.intechopen.com/books/x-ray-spectroscopy/quantification-in-x-ray-fluorescence-spectrometry.
Rozenstein, O. et al.; Development of a new approach based on midwave infrared spectroscopy for post-consumer black plastic waste sorting in the recycling industry; Waste Management 68 (2017; pp. 38-44; abstract.
Scrap Specifications Circular, Institute of Scrap Recycling Industries, Inc., effective Jan. 21, 2016, 58 pages.
Skpecim Spectral Imaging; Hyperspectral Technology vs. RGB; at least as early as Mar. 9, 2021; 3 pages; Oulu, Finland.
T. Miller et al., "Elemental Imaging For Pharmaceutical Tablet Formulations Analysis By Micro X-Ray Fluorescence," International Centre for Diffraction Data, 2005, Advances in X-ray Analysis, vol. 48, pp. 274-283.
T. Moriyama, "Pharmaceutical Analysis (5), Analysis of trace impurities in pharmaceutical products using polarized EDXRF spectrometer NEX CG," Rigaku Journal, vol. 29, No. 2, 2013, pp. 19-21.
The International Bureau of WIPO, International Preliminary Report on Patentability, International Application No. PCT/US2016/42850, Jan. 25, 2018.
The United States Patent and Trademark Office, Final Office Action, U.S. Appl. No. 16/375,675, filed Jan. 17, 2020.
The United States Patent and Trademark Office, Non-Final Office Action, U.S. Appl. No. 15/213,129, filed Oct. 6, 2017.
The United States Patent and Trademark Office, Non-Final Office Action, U.S. Appl. No. 16/375,675, filed Jun. 28, 2019.
United States International Searching Authority; International Search Report & Written Opinion for PCT/US2016/042850; Sep. 28, 2016; 15 pages; Alexandria, VA; US.
United States International Searching Authority; International Search Report & Written Opinion for PCT/US2022/015693; May 6, 2022; 9 pages; Alexandria, VA; US.
United States International Searching Authority; International Search Report & Written Opinion for PCT/US2022/015665; May 23, 2022; 10 pages; Alexandria, VA; US.
United States International Searching Authority; International Search Report & Written Opinion for PCT/US2022/020657; Jun. 16, 2022; 10 pages; Alexandria, VA.
United States International Searching Authority; International Search Report & Written Opinion for PCT/US2022/016869; Jun. 29, 2022; 11 pages; Alexandria, VA.
United States International Searching Authority; International Search Report & Written Opinion for PCT/US2022/060626; May 2, 2023; 12 pages; Alexandria, VA.
United States International Searching Authority; International Search Report & Written Opinion for PCT/US2022/051681; Mar. 20, 2023; 6 pages; Alexandria, VA.
United States International Searching Authority; International Search Report & Written Opinion for PCT/US2022/039622; Oct. 28, 2022; 12 pages; Alexandria, VA.
United States International Searching Authority; International Search Report & Written Opinion for PCT/US2022/047614; Feb. 21, 2023; 8 pages; Alexandria, VA.
United States International Searching Authority; International Search Report & Written Opinion for PCT/US2022/035011; Oct. 27, 2022; 8 pages; Alexandria, VA.
Wikipedia, Convolutional neural network, 18 pages https://en.wikipedia.org/w/index.php?title=Convolutional_neural network, downloaded from Internet on May 1, 2018.
Wikipedia, TensorFlow, 4 pages https://en.wikipedia.org/w/index.php?title=TensorFlow&oldid=835761390, downloaded from Internet on May 1, 2018.
Wikipedia; Digital image processing; Retrieved from https://en.wikipedia.org/w/index.php?title=Digital_image_processing&oldid=1015648152; Apr. 2, 2021; Wikimedia Foundation, Inc.; US.
Wikipedia, Machine vision; Retrieved from https://en.wikipedia.org/w/index.php?title=Machine_vision&oldid=1021673757; May 6, 2021; Wikimedia Foundation, Inc.; US.
Zhang, et al.; Designing and verifying a disassembly line approach to cope with the upsurge of end-of-life vehicles in China:, Elsevier, Waste Management 2018, Retrieved on Jul. 10, 2022 from <https://isiarticles.com/budles/Article/pre/pdf/98926.pdf>.
Zhou et al; SSA-CNN: Semantic Self-Attention CNN for Pedestrian Detetion:; arXiv: 1902.09080v3 [cs. CF] Jun. 6, 2019. Retrieved o Oct. 10, 2022; Retrieved from <URL: https://arxivorg/pdf/1902.09080.pdf>.

* cited by examiner

MULTIPLE STAGE SORTING

This application is a continuation of U.S. patent application Ser. No. 17/673,694, which is a continuation of U.S. patent application Ser. No. 17/491,415 (issued as U.S. Pat. No. 11,278,937), which is a continuation-in-part application of U.S. patent application Ser. No. 17/380,928, which is a continuation-in-part application of U.S. patent application Ser. No. 17/227,245 (issued as U.S. Pat. No. 11,964,304), which is a continuation-in-part application of U.S. patent application Ser. No. 16/939,011 (issued as U.S. Pat. No. 11,471,916), which is a continuation application of U.S. patent application Ser. No. 16/375,675 (issued as U.S. Pat. No. 10,722,922), which is a continuation-in-part application of U.S. patent application Ser. No. 15/963,755 (issued as U.S. Pat. No. 10,710,119), which claims priority to U.S. Provisional Patent Application Ser. No. 62/490,219, and which is a continuation-in-part application of U.S. patent application Ser. No. 15/213,129 (issued as U.S. Pat. No. 10,207,296), which claims priority to U.S. Provisional Patent Application Ser. No. 62/193,332, all of which are hereby incorporated by reference herein.

U.S. patent application Ser. No. 17/491,415 (issued as U.S. Pat. No. 11,278,937) is also a continuation-in-part application of U.S. patent application Ser. No. 16/852,514 (issued as U.S. Pat. No. 11,260,426), which is a divisional application of U.S. patent application Ser. No. 16/358,374 (issued as U.S. Pat. No. 10,625,304), which is a continuation-in-part application of U.S. patent application Ser. No. 15/963,755 issued as U.S. Pat. No. 10,710,119), all of which are hereby incorporated by reference herein.

GOVERNMENT LICENSE RIGHTS

This disclosure was made with U.S. government support under Grant No. DE-AR0000422 awarded by the U.S. Department of Energy. The U.S. government may have certain rights in this disclosure.

TECHNOLOGY FIELD

The present disclosure relates in general to the sorting of materials, and in particular, to the sorting of materials utilizing multiple stages of sorting.

BACKGROUND INFORMATION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Recycling is the process of collecting and processing materials that would otherwise be thrown away as trash, and turning them into new products. Recycling has benefits for communities and for the environment, since it reduces the amount of waste sent to landfills and incinerators, conserves natural resources, increases economic security by tapping a domestic source of materials, prevents pollution by reducing the need to collect new raw materials, and saves energy. After collection, recyclables are generally sent to a material recovery facility to be sorted, cleaned, and processed into materials that can be used in manufacturing.

The recycling of aluminum (Al) scrap is a very attractive proposition in that up to 95% of the energy costs associated with manufacturing can be saved when compared with the laborious extraction of the more costly primary aluminum. Primary aluminum is defined as aluminum originating from aluminum-enriched ore, such as bauxite. At the same time, the demand for aluminum is steadily increasing in markets, such as car manufacturing, because of its lightweight properties. As a result, there are certain economies available to the aluminum industry by developing a well-planned yet simple recycling plan or system. The use of recycled material would be a less expensive metal resource than a primary source of aluminum. As the amount of aluminum sold to the automotive industry (and other industries) increases, it will become increasingly necessary to use recycled aluminum to supplement the availability of primary aluminum.

Correspondingly, it is particularly desirable to efficiently separate aluminum scrap metals into alloy families, since mixed aluminum scrap of the same alloy family is worth much more than that of indiscriminately mixed alloys. For example, in the blending methods used to recycle aluminum, any quantity of scrap composed of similar, or the same, alloys and of consistent quality, has more value than scrap consisting of mixed aluminum alloys. Within such aluminum alloys, aluminum will always be the bulk of the material. However, constituents such as copper, magnesium, silicon, iron, chromium, zinc, manganese, and other alloy elements provide a range of properties to alloyed aluminum and provide a means to distinguish one aluminum alloy from the other.

The Aluminum Association is the authority that defines the allowable limits for aluminum alloy chemical composition. The data for the aluminum wrought alloy chemical compositions is published by the Aluminum Association in "International Alloy Designations and Chemical Composition Limits for Wrought Aluminum and Wrought Aluminum Alloys," which was updated in January 2015, and which is incorporated by reference herein. In general, according to the Aluminum Association, the 1xxx series of wrought aluminum alloys is composed essentially of pure aluminum with a minimum 99% aluminum content by weight; the 2xxx series is wrought aluminum principally alloyed with copper (Cu); the 3xxx series is wrought aluminum principally alloyed with manganese (Mn); the 4xxx series is wrought aluminum alloyed with silicon (Si); the 5xxx series is wrought aluminum primarily alloyed with magnesium (Mg); the 6xxx series is wrought aluminum principally alloyed with magnesium and silicon; the 7xxx series is wrought aluminum primarily alloyed with zinc (Zn); and the 8xxx series is a miscellaneous category.

The Aluminum Association also has a similar document for cast aluminum alloys. The 1xx series of cast aluminum alloys is composed essentially of pure aluminum with a minimum 99% aluminum content by weight; the 2xx series is cast aluminum principally alloyed with copper; the 3xx series is cast aluminum principally alloyed with silicon plus copper and/or magnesium; the 4xx series is cast aluminum principally alloyed with silicon; the 5xx series is cast aluminum principally alloyed with magnesium; the 6xx series is an unused series; the 7xx series is cast aluminum principally alloyed with zinc; the 8xx series is cast aluminum principally alloyed with tin; and the 9xx series is cast aluminum alloyed with other elements. Examples of cast alloys utilized for automotive parts include 380, 384, 356, 360, and 319. For example, recycled cast alloys 380 and 384 can be used to manufacture vehicle engine blocks, transmission cases, etc. Recycled cast alloy 356 can be used to manufacture aluminum alloy wheels. And, recycled cast alloy 319 can be used to manufacture transmission blocks.

In general, wrought aluminum alloys have a higher magnesium concentration than cast aluminum alloys, and cast aluminum alloys have a higher silicon concentration than wrought aluminum alloys.

Furthermore, the presence of commingled pieces of different alloys in a body of scrap limits the ability of the scrap to be usefully recycled, unless the different alloys (or, at least, alloys belonging to different compositional families such as those designated by the Aluminum Association) can be separated prior to re-melting. This is because, when commingled scrap of a plurality of different alloy compositions or composition families is re-melted, the resultant molten mixture contains proportions of the principal alloy and elements (or the different compositions) that are too high to satisfy the compositional limitations required in any particular commercial alloy.

Moreover, as evidenced by the production and sale of the Ford F-150 pickup having a considerable increase in its body and frame parts composed of aluminum instead of steel, it is additionally desirable to recycle sheet metal scrap (e.g., wrought aluminum of certain alloy compositions), including that generated in the manufacture of automotive components from sheet aluminum. Recycling of the scrap involves re-melting the scrap to provide a body of molten metal that can be cast and/or rolled into useful aluminum parts for further production of such vehicles. However, automotive manufacturing scrap (and metal scrap from other sources such as airplanes and commercial and household appliances) often includes a mixture of scrap pieces of wrought and cast pieces and/or two or more aluminum alloys differing substantially from each other in composition. Thus, those skilled in the aluminum alloy art will appreciate the difficulties of separating aluminum alloys, especially alloys that have been worked, such as cast, forged, extruded, rolled, and generally wrought alloys, into a reusable or recyclable worked product.

DETAILED DESCRIPTION

Figure 1:
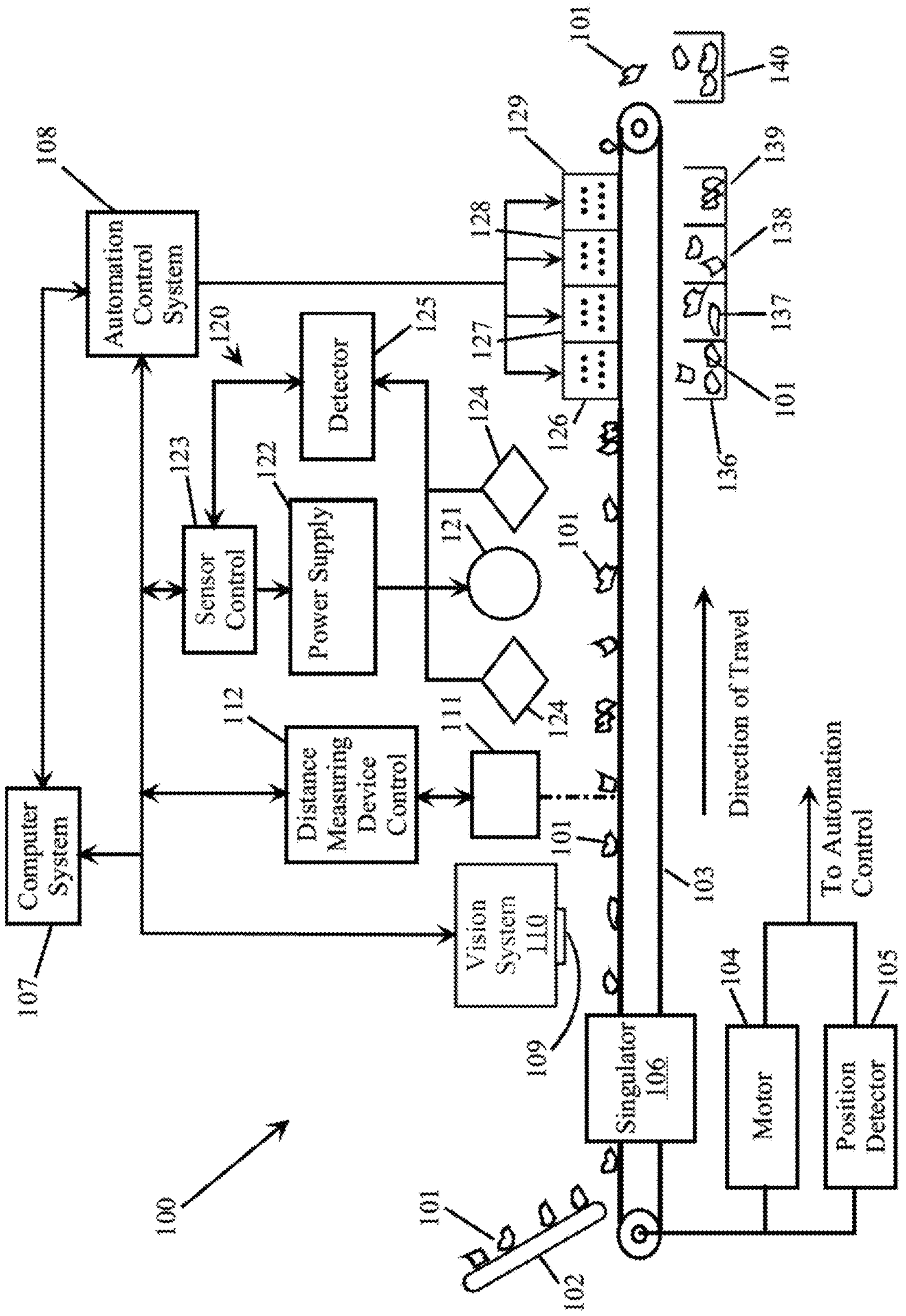
FIG. 1 illustrates a schematic of a sorting system configured in accordance with embodiments of the present disclosure.

Various detailed embodiments of the present disclosure are disclosed herein. However, it is to be understood that the disclosed embodiments are merely exemplary of the disclosure, which may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to employ various embodiments of the present disclosure.

As used herein, "chemical element" means a chemical element of the periodic table of chemical elements, including chemical elements that may be discovered after the filing date of this application. As used herein, a "material" may include a solid composed of a compound or mixture of one or more chemical elements, or a compound or mixture of a compound or mixture of chemical elements, wherein the complexity of a compound or mixture may range from being simple to complex (all of which may also be referred to herein as a material having a particular "chemical composition"). Classes of materials may include metals (ferrous and nonferrous), metal alloys, plastics (including, but not limited to PCB, HDPE, UHMWPE, and various colored plastics), rubber, foam, glass (including, but not limited to borosilicate or soda lime glass, and various colored glass), ceramics, paper, cardboard, Teflon, PE, bundled wires, insulation covered wires, rare earth elements, leaves, wood, plants, parts of plants, textiles, bio-waste, packaging, electronic waste, batteries and accumulators, end-of-life vehicles, mining, construction, and demolition waste, crop wastes, forest residues, purpose-grown grasses, woody energy crops, microalgae, urban food waste, food waste, hazardous chemical and biomedical wastes, construction debris, farm wastes, biogenic items, non-biogenic items, objects with a carbon content, any other objects that may be found within municipal solid waste, and any other objects, items, or materials disclosed herein, including further types or classes of any of the foregoing that can be distinguished from each other, including but not limited to, by one or more sensors, including but not limited to, any of the sensor technologies disclosed herein. As used herein, the term "aluminum" refers to aluminum metal and aluminum-based alloys, viz., alloys containing more than 50% by weight aluminum (including those classified by the Aluminum Association). Within this disclosure, the terms "scrap," "scrap pieces," "materials," "material pieces," and "pieces" may be used interchangeably. As used herein, a material piece or scrap piece referred to as having a metal alloy composition is a metal alloy having a particular chemical composition that distinguishes it from other metal alloys.

As defined within the Guidelines for Nonferrous Scrap promulgated by the Institute Of Scrap Recycling Industries, Inc., the term "Zorba" is the collective term for shredded nonferrous metals, including, but not limited to, those originating from end-of-life vehicles ("ELVs") or waste electronic and electrical equipment ("WEEE"). The Institute Of Scrap Recycling Industries, Inc. ("ISRI") in the United States established the specifications for Zorba. In Zorba, each scrap piece may be made up of a combination of the nonferrous metals: aluminum, copper, lead, magnesium, stainless steel, nickel, tin, and zinc, in elemental or alloyed (solid) form. Furthermore, the term "Twitch" shall mean fragmented aluminum scrap. Twitch may be produced by a float process whereby the aluminum scrap floats to the top because heavier metal scrap pieces sink (for example, in some processes, sand may be mixed in to change the density of the water in which the scrap is immersed).

As used herein, the terms "identify" and "classify," and the terms "identification" and "classification," and their derivative forms, may be utilized interchangeably. As used herein, to "classify" a piece of material is to determine a type or class of materials to which the piece of material belongs.

For example, in accordance with certain embodiments of the present disclosure, a vision system or sensor system (as further described herein) may be configured to collect any type of information for classifying materials, which classifications can be utilized within a sorting system to selectively sort material pieces as a function of a set of one or more physical and/or chemical characteristics (e.g., which may be user-defined), including but not limited to, color, texture, hue, shape, brightness, weight, density, chemical composition, size, uniformity, manufacturing type, chemical signature, radioactive signature, transmissivity to light, sound, or other signals, and reaction to stimuli such as various fields, including emitted and/or reflected electromagnetic radiation ("EM") of the material pieces.

The types or classes (i.e., classification) of materials may be user-definable and not limited to any known classification of materials. The granularity of the types or classes may range from very coarse to very fine. For example, the types or classes may include plastics, ceramics, glasses, metals, and other materials, where the granularity of such types or classes is relatively coarse; different metals and metal alloys such as, for example, zinc, copper, brass, chrome plate, and aluminum, where the granularity of such types or classes is finer; or between specific types of plastic, where the granularity of such types or classes is relatively fine. Thus, the types or classes may be configured to distinguish between materials of significantly different chemical compositions such as, for example, plastics and metal alloys, or to distinguish between materials of almost identical chemical compositions such as, for example, different types of metal alloys. It should be appreciated that the methods and systems discussed herein may be applied to accurately identify/classify pieces of material for which the chemical composition is completely unknown before being classified.

As used herein, "manufacturing type" refers to the type of manufacturing process by which the material in a material piece was manufactured, such as a metal part having been formed by a wrought process, having been cast (including, but not limited to, expendable mold casting, permanent mold casting, and powder metallurgy), having been forged, a material removal process, extruded, etc.

As referred to herein, a "conveyor system" may be any known piece of mechanical handling equipment that moves materials from one location to another, including, but not limited to, an acro-mechanical conveyor, automotive conveyor, belt conveyor, belt-driven live roller conveyor, bucket conveyor, chain conveyor, chain-driven live roller conveyor, drag conveyor, dust-proof conveyor, electric track vehicle system, flexible conveyor, gravity conveyor, gravity skatewheel conveyor, lineshaft roller conveyor, motorized-drive roller conveyor, overhead I-beam conveyor, overland conveyor, pharmaceutical conveyor, plastic belt conveyor, pneumatic conveyor, screw or auger conveyor, spiral conveyor, tubular gallery conveyor, vertical conveyor, vibrating conveyor, and wire mesh conveyor.

The material sorting systems described herein according to certain embodiments of the present disclosure receive a heterogeneous mixture of a plurality of material pieces, wherein at least one material within this heterogeneous mixture includes a composition of elements (e.g., a metal alloy composition) different from one or more other materials. Though all embodiments of the present disclosure may be utilized to sort any types or classes of materials as defined herein, certain embodiments of the present disclosure are hereinafter described for sorting metal alloy material pieces, including aluminum alloy material pieces, and including between wrought, extruded, and/or cast aluminum alloy material pieces.

Figure 6:
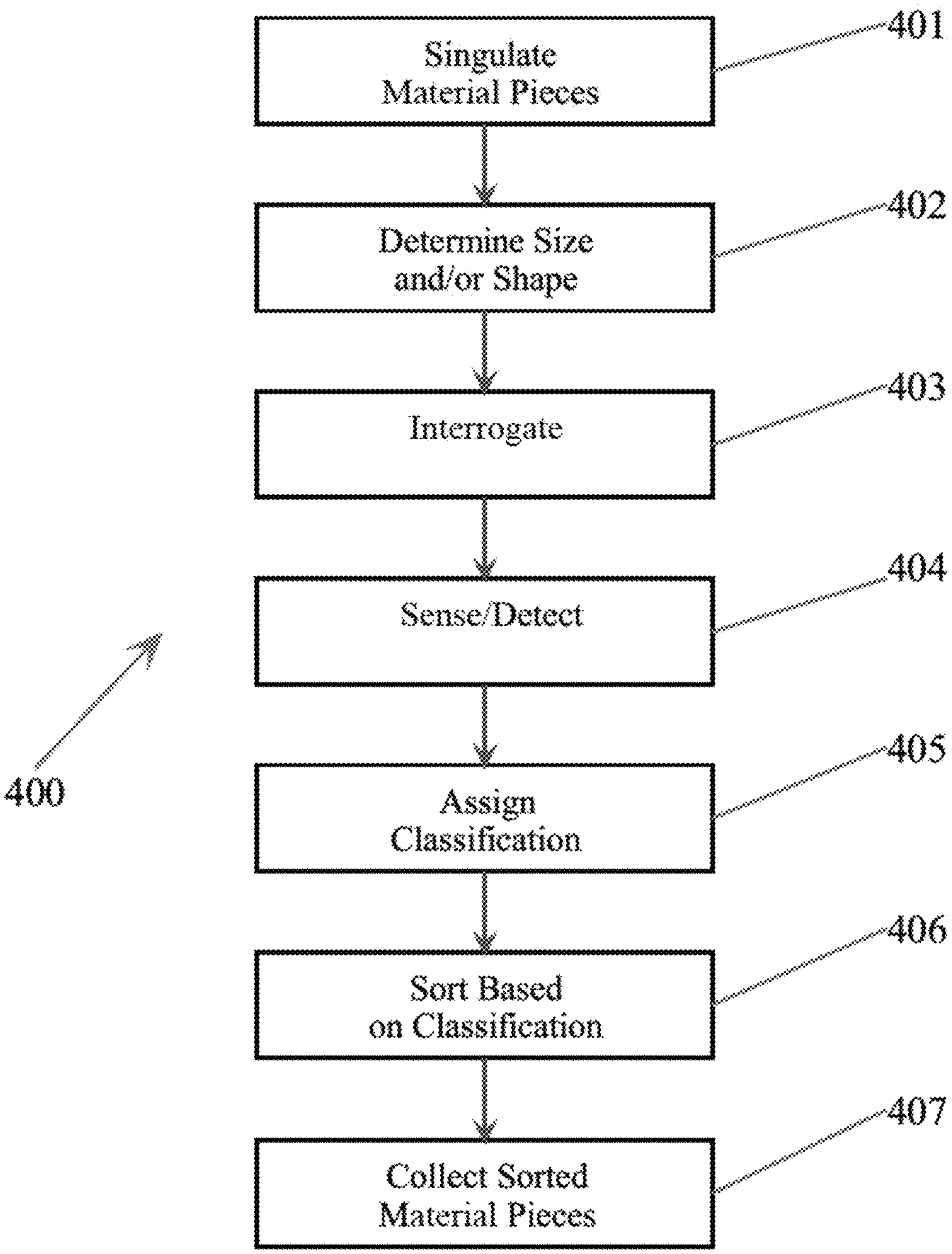
FIG. 6 illustrates a flowchart diagram configured in accordance with embodiments of the present disclosure.
Figure 7A:
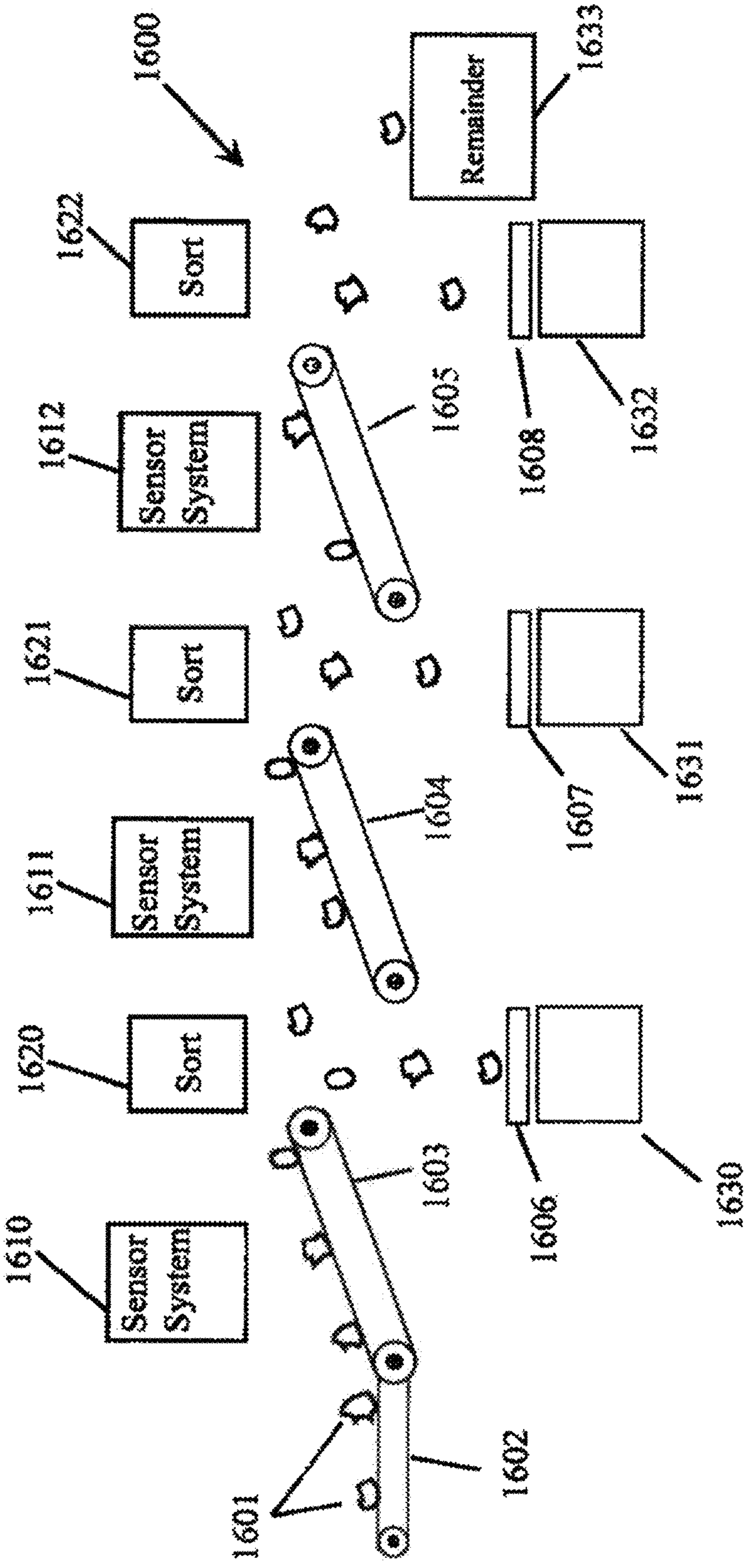
FIGS. 7A and 7B illustrate systems and processes for sorting of materials in accordance with certain embodiments of the present disclosure.
Figure 7B:
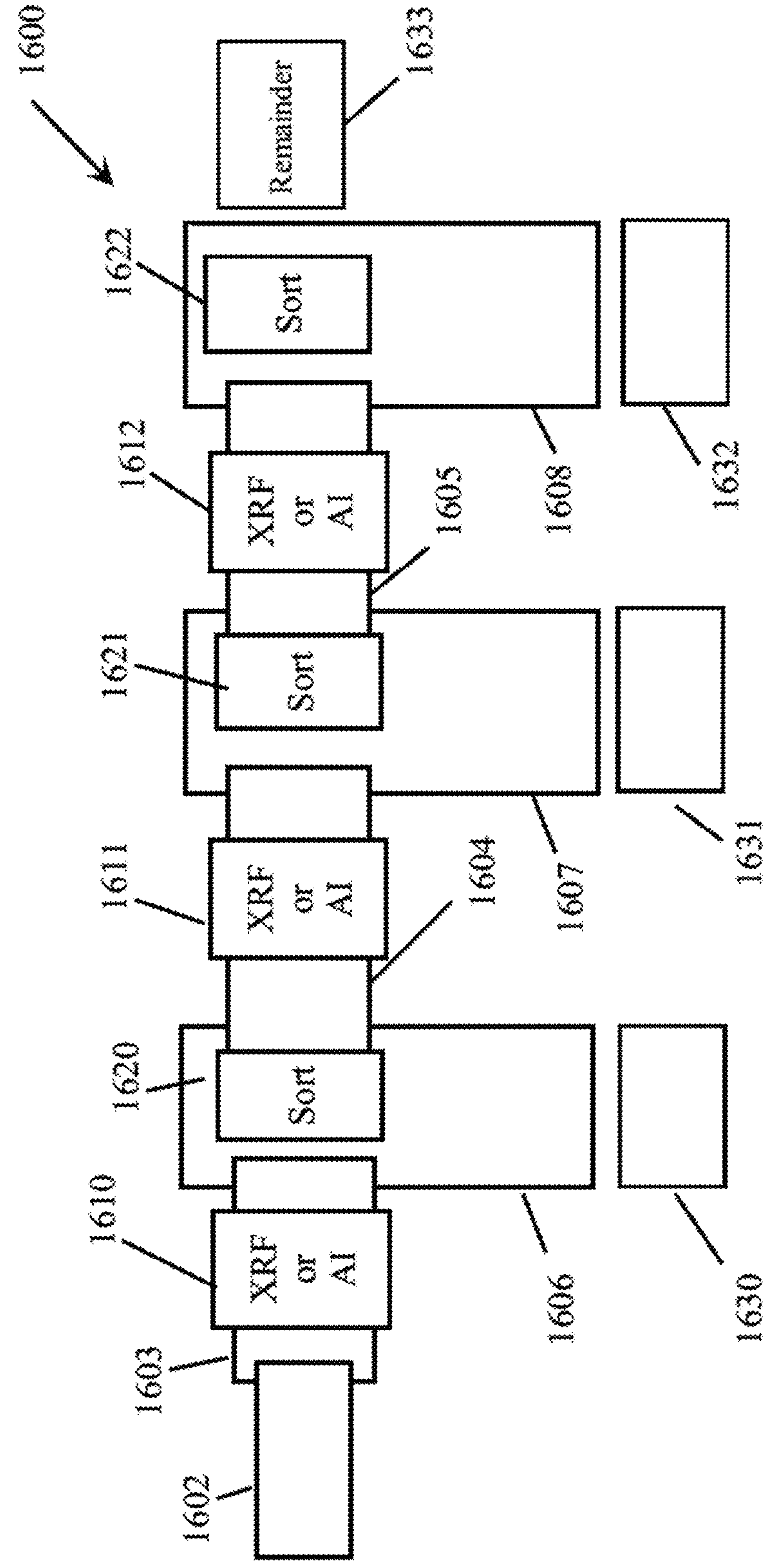
Figure 8:
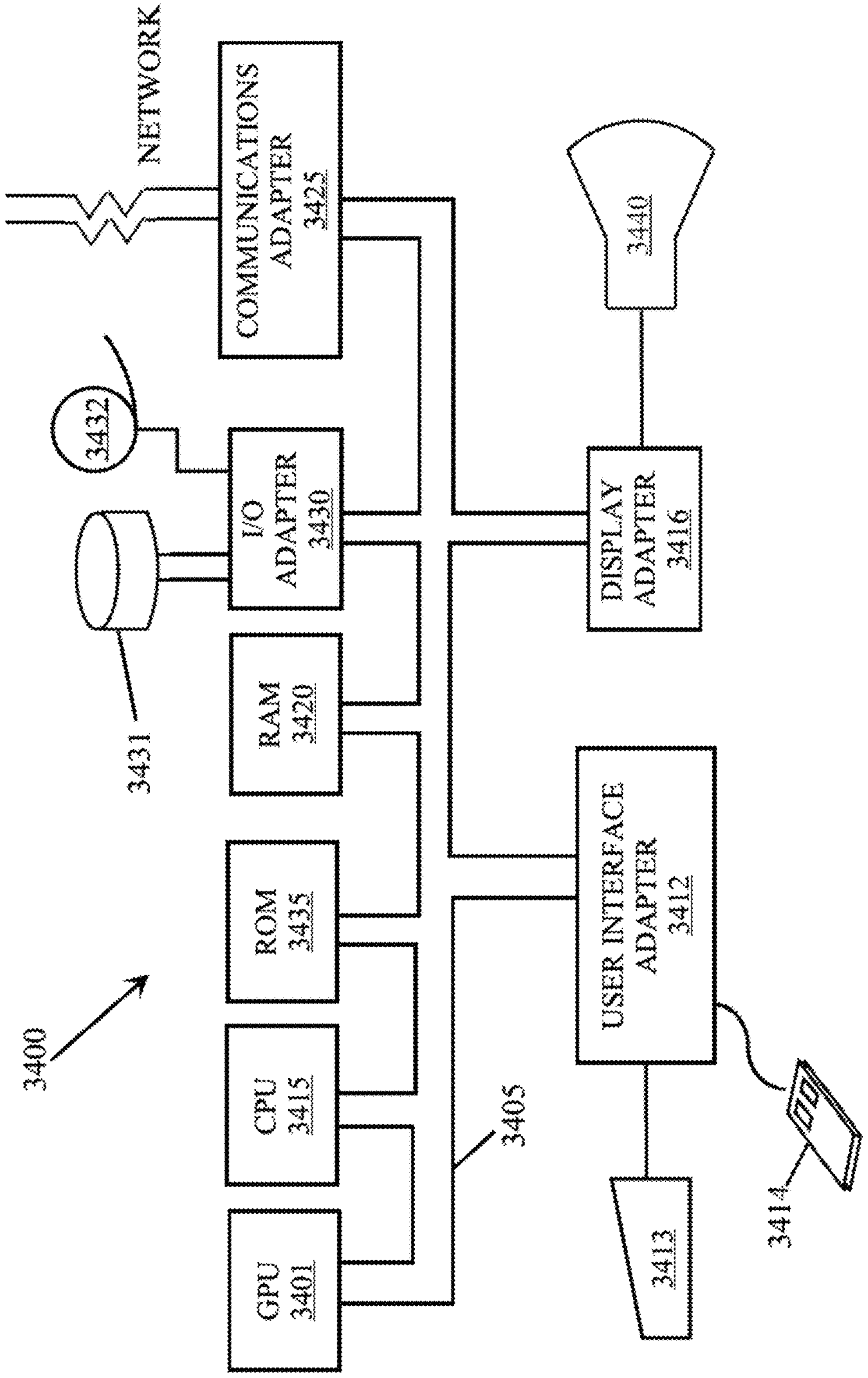
FIG. 8 illustrates a block diagram of a data processing system configured in accordance with embodiments of the present disclosure.

It should be noted that the materials to be sorted may have irregular sizes and shapes (e.g., see FIGS. 6-8). For example, such material (e.g., Zorba and/or Twitch) may have been previously run through some sort of shredding mechanism that chops up the materials into such irregularly shaped and sized pieces (producing scrap pieces), which may then be fed or diverted onto a conveyor system.

Embodiments of the present disclosure will be described herein as sorting material pieces into such separate groups or collections by physically depositing (e.g., ejecting or diverting) the material pieces into separate receptacles or bins, or onto another conveyor system, as a function of user-defined groupings or collections (e.g., material type classifications). As an example, within certain embodiments of the present disclosure, material pieces may be sorted in order to separate material pieces composed of a specific chemical composition, or compositions, from other material pieces composed of a different specific chemical composition.

Moreover, certain embodiments of the present disclosure may sort aluminum alloy material pieces into separate bins so that substantially all of the aluminum alloy material pieces having a chemical composition falling within one of the aluminum alloy series published by the Aluminum Association are sorted into a single bin (for example, a bin may correspond to one or more specific aluminum alloy series (e.g., 1000, 2000, 3000, 4000, 5000, 6000, 7000, 8000, 100, 200, 300, 400, 500, 600, 700, 800, 900)). Furthermore, as will be described herein, certain embodiments of the present disclosure may be configured to sort aluminum alloy material pieces into separate bins as a function of a classification of their alloy composition even if such alloy compositions fall within the same Aluminum Association series. As a result, the sorting system in accordance with certain embodiments of the present disclosure can classify and sort aluminum alloy material pieces having compositions that would all classify them into a single aluminum alloy series (e.g., the 300 series or the 500 series) into separate bins as a function of their aluminum alloy composition. In a non-limiting example, certain embodiments of the present disclosure can classify and sort into separate bins aluminum alloy material pieces classified as cast aluminum alloy 319 separate from aluminum alloy material pieces classified as cast aluminum alloy 380.

FIG. 1 illustrates an example of a system 100 configured in accordance with various embodiments of the present disclosure to automatically classify/sort materials. A conveyor system 103 may be implemented to convey individual material pieces 101 through the system 100 so that each of the individual material pieces 101 can be tracked, classified, and/or sorted into predetermined desired groups or collections. Such a conveyor system 103 may be implemented with one or more conveyor belts on which the material pieces 101 travel, typically at a predetermined constant speed. However, certain embodiments of the present disclosure may be implemented with other types of conveyor systems as disclosed herein. Hereinafter, wherein applicable, the conveyor system 103 may also be referred to as the conveyor belt 103. In one or more embodiments, some or all of the acts of conveying, stimulating, detecting, classifying, and sorting may be performed automatically, i.e., without human intervention. For example, in the system 100, one or more sources of stimuli, one or more emissions detectors, a classification module, a sorting apparatus, and/ or other system components may be configured to perform these and other operations automatically.

Furthermore, though the illustration in FIG. 1 depicts a single stream of material pieces 101 on a conveyor belt 103, embodiments of the present disclosure may be implemented in which a plurality of such streams of material pieces are passing by the various components of the system 100 in parallel with each other, or a collection of material pieces deposited in a random manner onto a conveyor system (e.g., the conveyor belt 103) are passed by the various components of the system 100. As such, certain embodiments of the present disclosure are capable of simultaneously tracking, classifying, and/or sorting a plurality of such parallel travelling streams of material pieces, or material pieces randomly deposited onto a conveyor system (belt). Nevertheless, in accordance with embodiments of the present disclosure, singulation of the material pieces 101 is not required to track, classify, and/or sort the material pieces.

The conveyor belt 103 may be a conventional endless belt conveyor employing a conventional drive motor 104 suitable to move the conveyor belt 103 at the predetermined speeds. In accordance with certain embodiments of the present disclosure, some sort of suitable feeder mechanism may be utilized to feed the material pieces 101 onto the conveyor belt 103, whereby the conveyor belt 103 conveys the material pieces 101 past various components within the system 100. Within certain embodiments of the present disclosure, the conveyor belt 103 is operated to travel at a predetermined speed by a conveyor belt motor 104. This predetermined speed may be programmable and/or adjustable by the operator in any well-known manner. Within certain embodiments of the present disclosure, control of the conveyor belt motor 104 and/or the position detector 105 may be performed by an automation control system 108. Such an automation control system 108 may be operated under the control of a computer system 107 and/or the functions for performing the automation control may be implemented in software within the computer system 107.

A position detector 105, which may be a conventional encoder, may be operatively coupled to the conveyor belt 103 and the automation control system 108 to provide information corresponding to the movement (e.g., speed) of the conveyor belt 103. Thus, as will be further described herein, through the utilization of the controls to the conveyor belt drive motor 104 and/or the automation control system 108 (and alternatively including the position detector 105), as each of the material pieces 101 travelling on the conveyor belt 103 are identified, they can be tracked by location and time (relative to the various components of the system 100) so that the various components of the system 100 can be activated/deactivated as each material piece 101 passes within their vicinity. As a result, the automation control system 108 is able to track the location of each of the material pieces 101 while they travel along the conveyor belt 103.

In accordance with certain embodiments of the present disclosure, after the material pieces 101 are received by the conveyor belt 103, a tumbler and/or a vibrator may be utilized to separate the individual material pieces from a collection of material pieces, and then they may be positioned into one or more singulated (i.e., single file) streams. In accordance with alternative embodiments of the present disclosure, the material pieces may be positioned into one or more singulated (i.e., single file) streams, which may be performed by an active or passive singulator 106. An example of a passive singulator is further described in U.S. Pat. No. 10,207,296. As previously discussed, incorporation or use of a singulator is not required. Instead, the conveyor system (e.g., the conveyor belt 103) may simply convey a collection of material pieces, which have been deposited onto the conveyor belt 103 in a random manner.

Referring again to FIG. 1, certain embodiments of the present disclosure may utilize a vision, or optical recognition, system 110 and/or a distance measuring device 111 as a means to begin tracking each of the material pieces 101 as they travel on the conveyor belt 103. The vision system 110 may utilize one or more still or live action cameras 109 to note the position (i.e., location and timing) of each of the material pieces 101 on the moving conveyor belt 103. The vision system 110 may be further, or alternatively, configured to perform certain types of identification (e.g., classification) of all or a portion of the material pieces 101. For example, such a vision system 110 may be utilized to acquire information about each of the material pieces 101. For example, the vision system 110 may be configured (e.g., with a machine learning system) to collect any type of information that can be utilized within the system 100 to classify the material pieces 101 as a function of a set of one or more (user-defined) physical characteristics, including, but not limited to, color, hue, size, shape, texture, overall physical appearance, uniformity, composition, and/or manufacturing type of the material pieces 101. The vision system 110 captures images of each of the material pieces 101 (including one-dimensional, two-dimensional, three-dimensional, or holographic imaging), for example, by using an optical sensor as utilized in typical digital cameras and video equipment. Such images captured by the optical sensor are then stored in a memory device as image data. In accordance with embodiments of the present disclosure, such image data represents images captured within optical wavelengths of light (i.e., the wavelengths of light that are observable by the typical human eye). However, alternative embodiments of the present disclosure may utilize sensors that are able to capture an image of a material made up of wavelengths of light outside of the visual wavelengths of the typical human eye.

In accordance with certain embodiments of the present disclosure, one or more sensor systems 120 may be utilized solely or in combination with the vision system 110 to classify/identify material pieces 101. A sensor system 120 may be configured with any type of sensor technology, including sensors utilizing irradiated or reflected electromagnetic radiation (e.g., utilizing infrared ("IR"), Fourier Transform IR ("FTIR"), Forward-looking Infrared ("FLIR"), Very Near Infrared ("VNIR"), Near Infrared ("NIR"), Short Wavelength Infrared ("SWIR"), Long Wavelength Infrared ("LWIR"), Medium Wavelength Infrared ("MWIR"), X-Ray Transmission ("XRT"), Gamma Ray, Ultraviolet, X-Ray Fluorescence ("XRF"), Laser Induced Breakdown Spectroscopy ("LIBS"), Raman Spectroscopy, Anti-stokes Raman Spectroscopy, Gamma Spectroscopy, Hyperspectral Spectroscopy (e.g., any range beyond visible wavelengths), Acoustic Spectroscopy, NMR Spectroscopy, Microwave Spectroscopy, Terahertz Spectroscopy, including one-dimensional, two-dimensional, or three-dimensional imaging with any of the foregoing), or by any other type of sensor technology, including but not limited to, chemical or radioactive. Implementation of an XRF system (e.g., for use as a sensor system 120 herein) is further described in U.S. Pat. No. 10,207,296.

It should be noted that though FIG. 1 is illustrated with a combination of a vision system 110 and a sensor system 120, embodiments of the present disclosure may be implemented with any combination of sensor systems utilizing any of the sensor technologies disclosed herein, or any other sensor technologies currently available or developed in the future. Though FIG. 1 is illustrated as including a sensor system 120, implementation of such a sensor system is optional within certain embodiments of the present disclosure. Within certain embodiments of the present disclosure, a combination of both the vision system 110 and one or more sensor systems 120 may be used to classify the material pieces 101. Within certain embodiments of the present disclosure, any combination of one or more of the different sensor technologies disclosed herein may be used to classify the material pieces 101 without utilization of a vision system 110. Furthermore, embodiments of the present disclosure may include any combinations of one or more sensor systems and/or vision systems in which the outputs of such sensor and/or vision systems are utilized by a machine learning system (as further disclosed herein) in order to classify/identify materials from a heterogeneous mixture of materials, which can then be sorted from each other.

In accordance with alternative embodiments of the present disclosure, a vision system 110 and/or sensor system(s) may be configured to identify which of the material pieces 101 are not of the kind to be sorted by the system 100 (sometimes referred to as contaminants), and send a signal to reject such material pieces. In such a configuration, the identified material pieces 101 may be diverted/ejected utilizing one of the mechanisms as described hereinafter for physically moving sorted material pieces into individual bins.

Within certain embodiments of the present disclosure, the distance measuring device 111 and accompanying control system 112 may be utilized and configured to measure the sizes and/or shapes of each of the material pieces 101 as they pass within proximity of the distance measuring device 111, along with the position (i.e., location and timing) of each of the material pieces 101 on the moving conveyor belt 103. An exemplary operation of such a distance measuring device 111 and control system 112 is further described in U.S. Pat. No. 10,207,296. Alternatively, as previously disclosed, the vision system 110 may be utilized to track the position (i.e., location and timing) of each of the material pieces 101 on the moving conveyor belt 103.

Such a distance measuring device 111 may be implemented with a well-known visible light (e.g., laser light) system, which continuously measures a distance the light travels before being reflected back into a detector of the laser light system. As such, as each of the material pieces 101 passes within proximity of the device 111, it outputs a signal to the control system 112 indicating such distance measurements. Therefore, such a signal may substantially represent an intermittent series of pulses whereby the baseline of the signal is produced as a result of a measurement of the distance between the distance measuring device 111 and the conveyor belt 103 during those moments when a material piece 101 is not in the proximity of the device 111, while each pulse provides a measurement of the distance between the distance measuring device 111 and a material piece 101 passing by on the conveyor belt 103. Since the material pieces 101 may have irregular shapes, such a pulse signal may also occasionally have an irregular height. Nevertheless, each pulse signal generated by the distance measuring device 111 provides the height of portions of each of the material pieces 101 as they pass by on the conveyor belt 103. The length of each of such pulses also provides a measurement of a length of each of the material pieces 101 measured along a line substantially parallel to the direction of travel of the conveyor belt 103. It is this length measurement (and alternatively the height measurements) that may be utilized within certain embodiments of the present disclosure to determine when to activate and deactivate the acquisition of detected fluorescence (i.e., the XRF spectrum) of each of the material pieces 101 by a sensor system 120 implementing an XRF system so that the detected fluorescence is obtained substantially only from each of the material pieces and not from any background surfaces, such as a conveyor belt 103. This results in a more accurate detection and analysis of the fluorescence, and also saves time in the signal processing of the detected signals since only data associated with detected fluorescence from the material pieces is having to be processed.

Within certain embodiments of the present disclosure that implement sensor system(s) 120, the sensor system(s) 120 may be configured to assist the vision system 110 to identify the chemical composition, or relative chemical compositions, of each of the material pieces 101 as they pass within proximity of the sensor system(s) 120. The sensor system(s) 120 may include an energy emitting source 121, which may be powered by a power supply 122, for example, in order to stimulate a response from each of the material pieces 101.

Within certain embodiments of the present disclosure, as each material piece 101 passes within proximity to the emitting source 121, a sensor system 120 may emit an appropriate sensing signal towards the material piece 101. One or more detectors 124 may be positioned and configured to sense/detect one or more physical characteristics from the material piece 101 in a form appropriate for the type of utilized sensor technology. The one or more detectors 124 and the associated detector electronics 125 capture the received sensed characteristics to perform signal processing thereon and produce digitized information representing the sensed characteristics, which are then analyzed in accordance with certain embodiments of the present disclosure, and which may be used in order to classify (solely or in combination with the vision system 110) each of the material pieces 101. This classification, which may be performed within the computer system 107, may then be utilized by the automation control system 108 to activate one of the N (N≥1) sorting devices 126 . . . 129 for sorting (e.g., diverting/ejecting) the material pieces 101 into one or more N (N≥1) sorting bins 136 . . . 139 according to the determined classifications. Four sorting devices 126 . . . 129 and four sorting bins 136 . . . 139 associated with the sorting devices are illustrated in FIG. 1 as merely a non-limiting example.

The sorting devices may include any well-known mechanisms for redirecting selected material pieces 101 towards a desired location, including, but not limited to, diverting the material pieces 101 from the conveyor belt system into the plurality of sorting bins. For example, a sorting device may utilize air jets, with each of the air jets assigned to one or more of the classifications. When one of the air jets (e.g., 127) receives a signal from the automation control system 108, that air jet emits a stream of air that causes a material piece 101 to be diverted/ejected from the conveyor system 103 into a sorting bin (e.g., 137) corresponding to that air jet. High speed air valves from Mac Industries may be used, for example, to supply the air jets with an appropriate air pressure configured to divert/eject the material pieces 101 from the conveyor system 103.

Although the example illustrated in FIG. 1 uses air jets to divert/eject material pieces, other mechanisms may be used to divert/eject the material pieces, such as robotically removing the material pieces from the conveyor belt, pushing the material pieces from the conveyor belt (e.g., with paint brush type plungers), causing an opening (e.g., a trap door) in the conveyor system 103 from which a material piece may drop, or using air jets to separate the material pieces into separate bins as they fall from the edge of the conveyor belt. A pusher device, as that term is used herein, may refer to any form of device which may be activated to dynamically displace an object on or from a conveyor system/device, employing pneumatic, mechanical, or other means to do so, such as any appropriate type of mechanical pushing mechanism (e.g., an ACME screw drive), pneumatic pushing mechanism, or air jet pushing mechanism. Some embodiments may include multiple pusher devices located at different locations and/or with different diversion path orientations along the path of the conveyor system. In various different implementations, these sorting systems describe herein may determine which pusher device to activate (if any) depending on characteristics of material pieces identified by the machine learning system. Moreover, the determination of which pusher device to activate may be based on the detected presence and/or characteristics of other objects that may also be within the diversion path of a pusher device concurrently with a target item. Furthermore, even for facilities where singulation along the conveyor system is not perfect, the disclosed sorting systems can recognize when multiple objects are not well singulated, and dynamically select from a plurality of pusher devices which should be activated based on which pusher device provides the best diversion path for potentially separating objects within close proximity. In some embodiments, objects identified as target objects may represent material that should be diverted off of the conveyor system. In other embodiments, objects identified as target objects represent material that should be allowed to remain on the conveyor system so that non-target materials are instead diverted.

In addition to the N sorting bins 136 . . . 139 into which material pieces 101 are diverted/ejected, the system 100 may also include a receptacle or bin 140 that receives material pieces 101 not diverted/ejected from the conveyor system 103 into any of the aforementioned sorting bins 136 . . . 139. For example, a material piece 101 may not be diverted/ejected from the conveyor system 103 into one of the N sorting bins 136 . . . 139 when the classification of the material piece 101 is not determined (or simply because the sorting devices failed to adequately divert/eject a piece), or when the material piece 101 contains a contaminant detected by the vision system 110 and/or the sensor system 120. Thus, the bin 140 may serve as a default receptacle into which unclassified material pieces are dumped. Alternatively, the bin 140 may be used to receive one or more classifications of material pieces that have deliberately not been assigned to any of the N sorting bins 136 . . . 139. These such material pieces may then be further sorted in accordance with other characteristics and/or by another sorting system.

Depending upon the variety of classifications of material pieces desired, multiple classifications may be mapped to a single sorting device and associated sorting bin. In other words, there need not be a one-to-one correlation between classifications and sorting bins. For example, it may be desired by the user to sort certain classifications of materials into the same sorting bin. To accomplish this sort, when a material piece 101 is classified as falling into a predetermined grouping of classifications, the same sorting device may be activated to sort these into the same sorting bin. Such combination sorting may be applied to produce any desired combination of sorted material pieces. The mapping of classifications may be programmed by the user (e.g., using the sorting algorithm (e.g., see FIG. 5) operated by the computer system 107) to produce such desired combinations. Additionally, the classifications of material pieces are user-definable, and not limited to any particular known classifications of material pieces.

The conveyor system 103 may include a circular conveyor (not shown) so that unclassified material pieces are returned to the beginning of the system 100 and run through the system 100 again. Moreover, because the system 100 is able to specifically track each material piece 101 as it travels on the conveyor system 103, some sort of sorting device (e.g., the sorting device 129) may be implemented to direct/eject a material piece 101 that the system 100 has failed to classify after a predetermined number of cycles through the system 100 (or the material piece 101 is collected in bin 140).

Within certain embodiments of the present disclosure, the conveyor system 103 may be divided into multiple belts configured in series such as, for example, two belts, where a first belt conveys the material pieces past the vision system 110 and/or an implemented sensor system 120, and a second belt conveys the material pieces from the vision system 110 and/or an implemented sensor system 120 to the sorting devices. Moreover, such a second conveyor belt may be at a lower height than the first conveyor belt, such that the material pieces fall from the first belt onto the second belt.

Within certain embodiments of the present disclosure that implement a sensor system 120, the emitting source 121 may be located above the detection area (i.e., above the conveyor system 103); however, certain embodiments of the present disclosure may locate the emitting source 121 and/or detectors 124 in other positions that still produce acceptable sensed/detected physical characteristics.

With systems 100 implementing an XRF system for a sensor system 120, signals representing the detected XRF spectrum may be converted into a discrete energy histogram such as on a per-channel (i.e., element) basis, as further described herein. Such a conversion process may be implemented within the control system 123, or the computer system 107. Within certain embodiments of the present disclosure, such a control system 123 or computer system 107 may include a commercially available spectrum acquisition module, such as the commercially available Amptech MCA 5000 acquisition card and software programmed to operate the card. Such a spectrum acquisition module, or other software implemented within the system 100, may be configured to implement a plurality of channels for dispersing x-rays into a discrete energy spectrum (i.e., histogram) with such a plurality of energy levels, whereby each energy level corresponds to an element that the system 100 has been configured to detect. The system 100 may be configured so that there are sufficient channels corresponding to certain elements within the chemical periodic table, which are important for distinguishing between different materials. The energy counts for each energy level may be stored in a separate collection storage register. The computer system 107 then reads each collection register to determine the number of counts for each energy level during the collection interval, and build the energy histogram. As will be described in more detail herein, a sorting algorithm configured in accordance with certain embodiments of the present disclosure may then utilize this collected histogram of energy levels to classify at least certain ones of the material pieces 101 and/or assist the vision system 110 in classifying the material pieces 101.

In accordance with certain embodiments of the present disclosure that implement an XRF system as the sensor system 120, the source 121 may include an in-line x-ray fluorescence ("IL-XRF") tube, such as further described within U.S. Pat. No. 10,207,296. Such an IL-XRF tube may include a separate x-ray source each dedicated for one or more streams (e.g., singulated) of conveyed material pieces. In such a case, the one or more detectors 124 may be implemented as XRF detectors to detect fluoresced x-rays from material pieces 101 within each of the singulated streams. Examples of such XRF detectors are further described within U.S. Pat. No. 10,207,296.

It should be appreciated that, although the systems and methods described herein are described primarily in relation to classifying material pieces in solid state, the disclosure is not so limited. The systems and methods described herein may be applied to classifying a material having any of a range of physical states, including, but not limited to a liquid, molten, gaseous, or powdered solid state, another state, and any suitable combination thereof.

The systems and methods described herein may be applied to classify and/or sort individual material pieces having any of a variety of sizes as small as a ¼ inch in diameter or less. Even though the systems and methods described herein are described primarily in relation to sorting individual material pieces of a singulated stream one at a time, the systems and methods described herein are not limited thereto. Such systems and methods may be used to stimulate and/or detect emissions from a plurality of materials concurrently. For example, as opposed to a singulated stream of materials being conveyed along one or more conveyor belts in series, multiple singulated streams may be conveyed in parallel. Each stream may be a on a same belt or on different belts arranged in parallel. Further, pieces may be randomly distributed on (e.g., across and along) one or more conveyor belts. Accordingly, the systems and methods described herein may be used to stimulate, and/or detect emissions from, a plurality of these small pieces at the same time. In other words, a plurality of small pieces may be treated as a single piece as opposed to each small piece being considered individually. Accordingly, the plurality of small pieces of material may be classified and sorted (e.g., diverted/ejected from the conveyor system) together. It should be appreciated that a plurality of larger material pieces also may be treated as a single material piece.

As previously noted, certain embodiments of the present disclosure may implement one or more vision systems (e.g., vision system 110) in order to identify, track, and/or classify material pieces. In accordance with embodiments of the present disclosure, such a vision system(s) may operate alone to identify and/or classify and sort material pieces, or may operate in combination with a sensor system (e.g., sensor system 120) to identify and/or classify and sort material pieces. If a sorting system (e.g., system 100) is configured to operate solely with such a vision system(s) 110, then the sensor system 120 may be omitted from the system 100 (or simply deactivated).

Such a vision system may be configured with one or more devices for capturing or acquiring images of the material pieces as they pass by on a conveyor system. The devices may be configured to capture or acquire any desired range of wavelengths irradiated or reflected by the material pieces, including, but not limited to, visible, infrared ("IR"), ultraviolet ("UV") light. For example, the vision system may be configured with one or more cameras (still and/or video, either of which may be configured to capture two-dimensional, three-dimensional, and/or holographical images) positioned in proximity (e.g., above) the conveyor system so that images of the material pieces are captured as they pass by the sensor system(s). In accordance with alternative embodiments of the present disclosure, data captured by a sensor system 120 may be processed (converted) into data to be utilized (either solely or in combination with the image data captured by the vision system 110) for classifying/sorting of the material pieces. Such an implementation may be in lieu of, or in combination with, utilizing the sensor system 120 for classifying material pieces.

Regardless of the type(s) of sensed characteristics/information captured of the material pieces, the information may then be sent to a computer system (e.g., computer system 107) to be processed by a machine learning system in order to identify and/or classify each of the material pieces. Such a machine learning system may implement any well-known machine learning system, including one that implements a neural network (e.g., artificial neural network, deep neural network, convolutional neural network, recurrent neural network, autoencoders, reinforcement learning, etc.), supervised learning, unsupervised learning, semi-supervised learning, reinforcement learning, self learning, feature learning, sparse dictionary learning, anomaly detection, robot learning, association rule learning, fuzzy logic, artificial intelligence ("AI"), deep learning algorithms, deep structured learning hierarchical learning algorithms, support vector machine ("SVM") (e.g., linear SVM, nonlinear SVM, SVM regression, etc.), decision tree learning (e.g., classification and regression tree ("CART"), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.) and/or deep machine learning algorithms, such as those described in and publicly available at the deeplearning.net website (including all software, publications, and hyperlinks to available software referenced within this website), which is hereby incorporated by reference herein. Non-limiting examples of publicly available machine learning software and libraries that could be utilized within embodiments of the present disclosure include Python, OpenCV, Inception, Theano, Torch, PyTorch, Pylearn2, Numpy, Blocks, TensorFlow, MXNet, Caffe, Lasagne, Keras, Chainer, Matlab Deep Learning, CNTK, MatConvNet (a MATLAB toolbox implementing convolutional neural networks for computer vision applications), DeepLearnToolbox (a Matlab toolbox for Deep Learning (from Rasmus Berg Palm)), BigDL, Cuda-Convnet (a fast C++/CUDA implementation of convolutional (or more generally, feed-forward) neural networks), Deep Belief Networks, RNNLM, RNNLIB-RNNLIB, matrbm, deeplearning4j, Eblearn.Ish, decpmat, MShadow, Matplotlib, SciPy, CXXNET, Nengo-Nengo, Eblearn, cudamat, Gnumpy, 3-way factored RBM and mcRBM, mPOT (Python code using CUDAMat and Gnumpy to train models of natural images), ConvNet, Elektronn, OpenNN, NeuralDesigner, Theano Generalized Hebbian Learning, Apache Singa, Lightnet, and SimpleDNN.

Machine learning often occurs in two stages. For example, first, training occurs, which may be performed offline in that the system 100 is not being utilized to perform actual classifying/sorting of material pieces. The system 100 may be utilized to train the machine learning system in that homogenous sets (also referred to herein as control samples) of material pieces (i.e., having the same types or classes of materials) are passed through the system 100 (e.g., by a conveyor system 103); and all such material pieces may not be sorted, but may be collected in a common bin (e.g., bin 140). Alternatively, the training may be performed at another location remote from the system 100, including using some other mechanism for collecting sensed information (characteristics) of homogenous sets of material pieces. During this training stage, algorithms within the machine learning system extract features from the captured information (e.g., using image processing techniques well known in the art). Non-limiting examples of training algorithms include, but are not limited to, linear regression, gradient descent, feed forward, polynomial regression, learning curves, regularized learning models, and logistic regression. It is during this training stage that the algorithms within the machine learning system learn the relationships between different types of materials and their features/characteristics (e.g., as captured by the vision system and/or sensor system(s)), creating a knowledge base for later classification of a heterogeneous mixture of material pieces received by the system 100 for sorting by desired classifications. Such a knowledge base may include one or more libraries, wherein each library includes parameters (also referred to herein as "neural network parameters") for utilization by the machine learning system in classifying material pieces. For example, one particular library may include parameters configured by the training stage to recognize and classify a particular type or class of material. In accordance with certain embodiments of the present disclosure, such libraries may be inputted into the machine learning system and then the user of the system 100 may be able to adjust certain ones of the parameters in order to adjust an operation of the system 100 (for example, adjusting the threshold effectiveness of how well the machine learning system recognizes a particular material from a heterogeneous mixture of materials).

Additionally, the inclusion of certain materials (e.g., chemical elements or compounds) in material pieces (e.g., metal alloys), or combinations of certain chemical elements or compounds, result in identifiable physical features (e.g., visually discernible characteristics) in materials. As a result, when a plurality of material pieces containing such a particular composition are passed through the aforementioned training stage, the machine learning system can learn how to distinguish such material pieces from others. Consequently, a machine learning system configured in accordance with certain embodiments of the present disclosure may be configured to sort between material pieces as a function of their respective material/chemical compositions. For example, such a machine learning system may be configured so that aluminum alloys can be sorted as a function of the percentage of a specified alloying material contained within the aluminum alloys.

Figure 2:
FIG. 2 shows visual images of exemplary material pieces from cast aluminum.
Figure 3:
FIG. 3 shows visual images of exemplary material pieces from aluminum extrusions.
Figure 4:
FIG. 4 shows visual images of exemplary material pieces from wrought aluminum.

For example, FIG. 2 shows captured or acquired images of exemplary material pieces of cast aluminum, which may be used during the aforementioned training stage. FIG. 3 shows captured or acquired images of exemplary material pieces of extruded aluminum, which may be used during the aforementioned training stage. FIG. 4 shows captured or acquired images of exemplary material pieces of wrought aluminum, which may be used during the aforementioned training stage. During the training stage, a plurality of material pieces of a particular (homogenous) classification (type) of material, which are the control samples, may be delivered past the vision system by the conveyor system so that the machine learning system detects, extracts, and learns what features visually represent such exemplary material pieces. In other words, images of cast aluminum material pieces such as shown in FIG. 2 may be first passed through such a training stage so that the machine learning algorithm "learns" how to detect, recognize, and classify material pieces composed of cast aluminum alloys. This creates a library of parameters particular to cast aluminum material pieces. Then, the same process can be performed with respect to images of extruded aluminum material pieces, such as shown in FIG. 3, creating a library of parameters particular to extruded aluminum material pieces. And, the same process can be performed with respect to images of wrought aluminum material pieces, such as shown in FIG. 4, creating a library of parameters particular to wrought aluminum material pieces. For each type of material to be classified by the vision system, any number of exemplary material pieces of that type of material may be passed by the vision system. Given a captured image as input data, the machine learning algorithms may use N classifiers, each of which test for one of N different material types.

After the algorithms have been established and the machine learning system has sufficiently learned the differences for the material classifications (e.g., within a user-defined level of statistical confidence), the libraries of neural network parameters for the different materials are then implemented into a material classifying and/or sorting system (e.g., system 100) to be used for identifying and/or classifying material pieces from a heterogeneous mixture of material pieces, and then possibly sorting such classified material pieces if sorting is to be performed.

Techniques to construct, optimize, and utilize a machine learning system are known to those of ordinary skill in the art as found in relevant literature. Examples of such literature include the publications: Krizhevsky et al., "*ImageNet Classification with Deep Convolutional Networks*," Proceedings of the 25th International Conference on Neural Information Processing Systems, Dec. 3-6, 2012, Lake Tahoe, Nev., and LeCun et al., "*Gradient-Based Learning Applied to Document Recognition*," Proceedings of the IEEE, Institute of Electrical and Electronic Engineers (IEEE), November 1998, both of which are hereby incorporated by reference herein in their entirety.

In an example technique, data captured by a sensor and/or vision system with respect to a particular material piece may be processed as an array of data values. For example, the data may be image data captured by a digital camera or other type of imaging sensor with respect to a particular material piece and processed as an array of pixel values. Each data value may be represented by a single number, or as a series of numbers representing values. These values are multiplied by the neuron weight parameters, and may possibly have a bias added. This is fed into a neuron nonlinearity. The resulting number output by the neuron can be treated much as the values were, with this output multiplied by subsequent neuron weight values, a bias optionally added, and once again fed into a neuron nonlinearity. Each such iteration of the process is known as a "layer" of the neural network. The final outputs of the final layer may be interpreted as probabilities that a material is present or absent in the captured data pertaining to the material piece. Examples of such a process are described in detail in both of the previously noted "*ImageNet Classification with Deep Convolutional Networks*" and "*Gradient-Based Learning Applied to Document Recognition*" references.

In accordance with embodiments of the present disclosure, as a final layer (the "classification layer"), the final set of neurons' outputs is trained to represent the likelihood a material piece is associated with the captured data. During operation, if the likelihood that a material piece is associated with the captured data is over a user-specified threshold, then it is determined that the particular material piece is indeed associated with the captured data. These techniques can be extended to determine not only the presence of a type of material associated with particular captured data, but also whether sub-regions of the particular captured data belong to one type of material or another type of material. This process is known as segmentation, and techniques to use neural networks exist in the literature, such as those known as "fully convolutional" neural networks, or networks that otherwise include a convolutional portion (i.e., are partially convolutional), if not fully convolutional. This allows for material location and size to be determined.

It should be understood that the present disclosure is not exclusively limited to machine learning techniques. Other common techniques for material classification/identification may also be used. For instance, a sensor system may utilize optical spectrometric techniques using multi- or hyper-spectral cameras to provide a signal that may indicate the presence or absence of a type of material by examining the spectral emissions of the material. Photographs of a material piece may also be used in a template-matching algorithm, wherein a database of images is compared against an acquired image to find the presence or absence of certain types of materials from that database. A histogram of the captured image may also be compared against a database of histograms. Similarly, a bag of words model may be used with a feature extraction technique, such as scale-invariant feature transform ("SIFT"), to compare extracted features between a captured image and those in a database.

Therefore, as disclosed herein, certain embodiments of the present disclosure provide for the identification/classification of one or more different materials in order to determine which material pieces should be diverted from a conveyor system or device. In accordance with certain embodiments, machine learning techniques are utilized to train (i.e., configure) a neural network to identify a variety of one or more different materials. Images, or other types of sensed information, are captured of materials (e.g., traveling on a conveyor system), and based on the identification/classification of such materials, the systems described herein can decide which material piece should be allowed to remain on the conveyor system, and which should be diverted/removed from the conveyor system (for example, either into a collection bin, or diverted onto another conveyor system).

In accordance with certain embodiments of the present disclosure, a machine learning system for an existing installation may be dynamically reconfigured to detect and recognize characteristics of a new material by replacing a current set of neural network parameters with a new set of neural network parameters.

One point of mention here is that, in accordance with certain embodiments of the present disclosure, the detected/extracted features/characteristics of the material pieces may not be necessarily simply particularly identifiable physical characteristics; they can be abstract formulations that can only be expressed mathematically, or not mathematically at all; nevertheless, the machine learning system parses all of the data to look for patterns that allow the control samples to be classified during the training stage. Furthermore, the machine learning system may take subsections of captured information of a material piece and attempt to find correlations between the pre-defined classifications.

In accordance with certain embodiments of the present disclosure, instead of utilizing a training stage whereby control samples of material pieces are passed by the vision system and/or sensor system(s), training of the machine learning system may be performed utilizing a labeling/annotation technique (or any other supervised learning technique) whereby as data/information of material pieces are captured by a vision/sensor system, a user inputs a label or annotation that identifies each material piece, which is then used to create the library for use by the machine learning system when classifying material pieces within a heterogenous mixture of material pieces.

In accordance with certain embodiments of the present disclosure, any sensed characteristics output by any of the sensor systems 120 disclosed herein may be input into a machine learning system in order to classify and/or sort materials. For example, in a machine learning system implementing supervised learning, sensor system 120 outputs that uniquely characterize a particular type or composition of material (e.g., a particular metal alloy) may be used to train the machine learning system.

After going through a shredder, sidings (typically made from thin aluminum sheets), extrusions (typically manufactured from thick aluminum framing bars), and castings look very different. FIG. 2 shows visual images of exemplary scrap pieces from cast aluminum. FIG. 3 shows visual images of exemplary scrap pieces from aluminum extrusions. FIG. 4 shows visual images of exemplary scrap pieces from wrought aluminum. Embodiments of the present disclosure utilize a vision system as described herein capable of classifying/sorting between these three different types of aluminum scrap pieces. As shown by the examples in FIGS. 2-4, aluminum extrusions have an overall physical appearance that is distinguishable from cast and wrought aluminum scrap pieces, which can be learned by a machine learning system configured in accordance with embodiments of the present disclosure.

Embodiments of the present disclosure are configured to sort the wrought aluminum alloy material pieces from the Twitch, which contains both wrought and cast aluminum pieces. In certain embodiments of the present disclosure, extruded aluminum alloy pieces can be sorted with the wrought aluminum alloy pieces (or sorted separately from both cast and wrought aluminum). Since most of the Mg is within the wrought aluminum, the remaining aluminum scrap pieces, containing mostly cast aluminum alloys, have relatively insignificant amounts of Mg. In accordance with certain embodiments of the present disclosure, another sort (or plurality of sorting cycles) can be performed on these remaining aluminum scrap pieces (also referred to herein as the "cast fraction") in order to classify/sort between any plurality of different cast aluminum alloys and/or to remove other impurities (e.g., scrap pieces composed of PCB, stainless steel, foam, rubber, etc.). The cast fraction may include cast alloys such as 319, 356, 360, and/or 380 series alloy pieces. These alloys contain varying amounts of silicon, Cu, Zn, Fe, and Mn, but contain extremely small amounts of Mg, typically 0-0.6%.

In accordance with certain embodiments of the present disclosure, one or more of the sensor systems 120 disclosed herein may be utilized to classify/sort either or both of the aforementioned cast fractions and wrought fractions. For example, one or both of an XRF system and/or a sensor system using LIBS may be utilized to classify/sort between two or more different cast aluminum alloys or two or more different wrought aluminum alloys. The utilization of an XRF system to do so is disclosed in U.S. Pat. No. 10,207,296.

The spectroscopy technique known as Laser-Induced Breakdown Spectroscopy ("LIBS), Laser Spark Spectroscopy ("LSS"), or Laser-Induced Optical Emission Spectroscopy ("LIOES") uses a focused laser beam to vaporize and subsequently produce spectral line emissions from a sample material. In this way samples placed at a distance from the analyzing instrumentation, can be analyzed for their chemical composition. Embodiments of the present disclosure can utilize any one of the foregoing to classify a plurality of materials into different classes for sorting. The use of LIBS for sorting is further described in U.S. Pat. Nos. 5,042,947, 6,545,240, and 10,478,861, all of which are hereby incorporated by reference herein.

Figure 5:
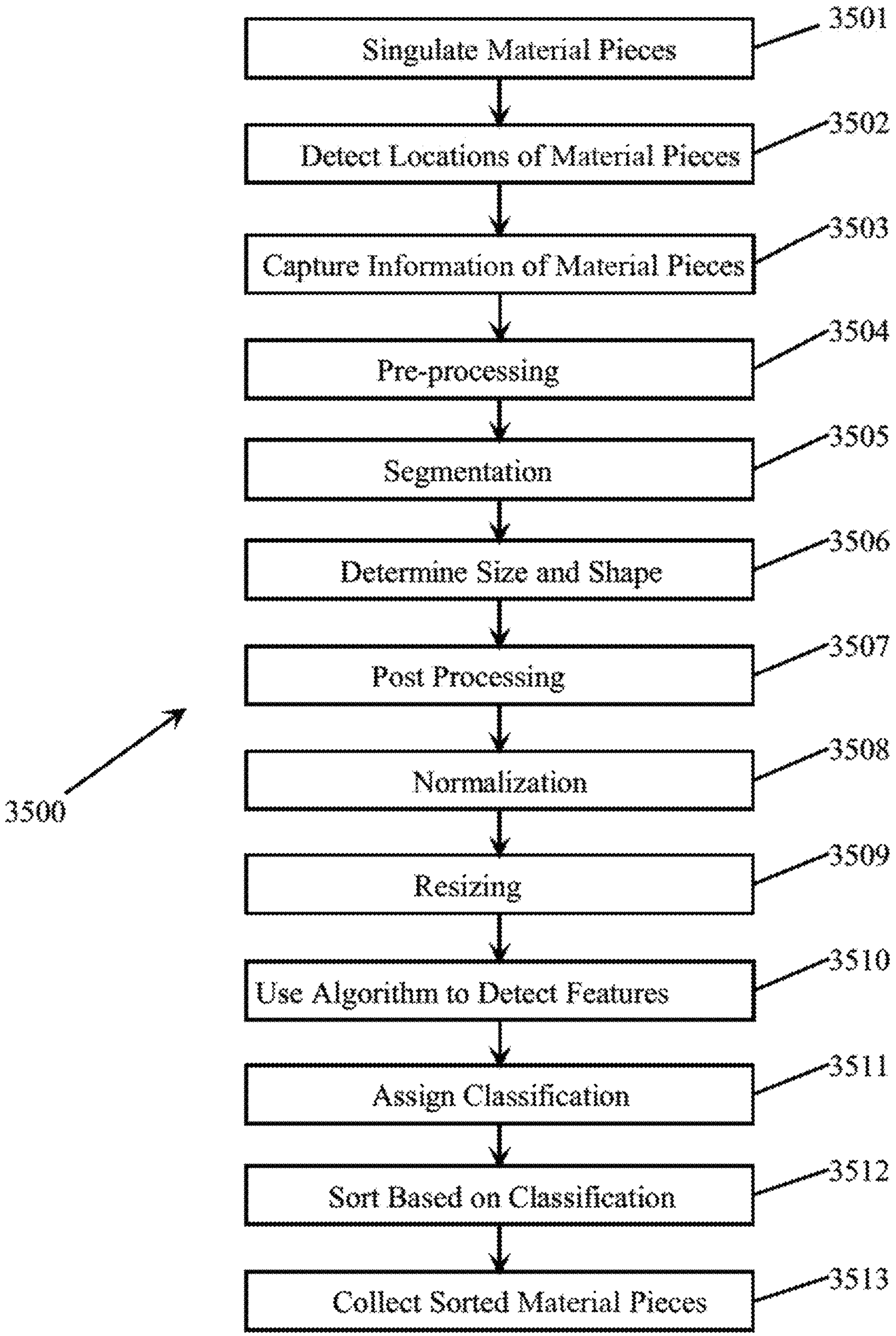
FIG. 5 illustrates a flowchart diagram configured in accordance with embodiments of the present disclosure.

FIG. 5 illustrates a flowchart diagram depicting exemplary embodiments of a process 3500 of classifying/sorting material pieces utilizing a vision system and/or sensor system in accordance with certain embodiments of the present disclosure. The process 3500 may be configured to operate within any of the embodiments of the present disclosure described herein, including the system 100 of FIG. 1. Operation of the process 3500 may be performed by hardware and/or software, including within a computer system (e.g., computer system 3400 of FIG. 8) controlling the sorting system (e.g., the computer system 107, the vision system 110, and/or the sensor system(s) 120 of FIG. 1). In the process block 3501, the material pieces are fed onto a conveyor system. In the process block 3502, the location on the conveyor system of each material piece is detected for tracking of each material piece as it travels through the sorting system. This may be performed by the vision system 110 (for example, by distinguishing a material piece from the underlying conveyor system material while in communication with a conveyor system position detector (e.g., the position detector 105)). Alternatively, a linear sheet laser beam can be used to locate the pieces. Or, any system that can create a light source (including, but not limited to, visual light, UV, and IR) and have a detector that can be used to locate the pieces. In the process block 3503, when a material piece has traveled in proximity to one or more of the vision system and/or the sensor system(s), sensed information/characteristics of the material piece is captured/acquired. In the process block 3504, a vision system (e.g., implemented within the computer system 107), such as previously disclosed, may perform pre-processing of the captured information, which may be utilized to detect (extract) each of the material pieces (e.g., from the background (e.g., the conveyor belt); in other words, the pre-processing may be utilized to identify the difference between the material piece and the background). Well-known image processing techniques such as dilation, thresholding, and contouring may be utilized to identify the material piece as being distinct from the background. In the process block 3505, segmentation may be performed. For example, the captured information may include information pertaining to one or more material pieces. Additionally, a particular material piece may be located on a seam of the conveyor belt when its image is captured. Therefore, it may be desired in such instances to isolate the image of an individual material piece from the background of the image. In an exemplary technique for the process block 3505, a first step is to apply a high contrast of the image; in this fashion, background pixels are reduced to substantially all black pixels, and at least some of the pixels pertaining to the material piece are brightened to substantially all white pixels. The image pixels of the material piece that are white are then dilated to cover the entire size of the material piece. After this step, the location of the material piece is a high contrast image of all white pixels on a black background. Then, a contouring algorithm can be utilized to detect boundaries of the material piece. The boundary information is saved, and the boundary locations are then transferred to the original image. Segmentation is then performed on the original image on an area greater than the boundary that was earlier defined. In this fashion, the material piece is identified and separated from the background.

In the optional process block 3506, the material pieces may be conveyed along the conveyor system within proximity of a distance measuring device and/or a sensor system in order to determine a size and/or shape of the material pieces, which may be useful if an XRF system, LIBS system, or some other spectroscopy sensor is also implemented within the sorting system and requires such size and/or shape determinations. In the process block 3507, post processing may be performed. Post processing may involve resizing the captured information/data to prepare it for use in the neural networks. This may also include modifying certain properties (e.g., enhancing image contrast, changing the image background, or applying filters) in a manner that will yield an enhancement to the capability of the machine learning system to classify the material pieces. In the process block 3509, the data may be resized. Data resizing may be necessary under certain circumstances to match the data input requirements for certain machine learning systems, such as neural networks. For example, neural networks may require much smaller image sizes (e.g., 225×255 pixels or 299×299 pixels) than the sizes of the images captured by typical digital cameras. Moreover, the smaller the input data size, the less processing time is needed to perform the classification. Thus, smaller data sizes can ultimately increase the throughput of the sorter system 100 and increase its value.

In the process blocks 3510 and 3511, for each material piece, the type or class of material is identified/classified based on the sensed/detected features. For example, the process block 3510 may be configured with a neural network employing one or more machine learning algorithms, which compare the extracted features with those stored in the knowledge base generated during the training stage, and assigns the classification with the highest match to each of the material pieces based on such a comparison. The algorithms of the machine learning system may process the captured information/data in a hierarchical manner by using automatically trained filters. The filter responses are then successfully combined in the next levels of the algorithms until a probability is obtained in the final step. In the process block 3511, these probabilities may be used for each of the N classifications to decide into which of the N sorting bins the respective material pieces should be sorted. For example, each of the N classifications may be assigned to one sorting bin, and the material piece under consideration is sorted into that bin that corresponds to the classification returning the highest probability larger than a predefined threshold. Within embodiments of the present disclosure, such predefined thresholds may be preset by the user. A particular material piece may be sorted into an outlier bin (e.g., sorting bin 140) if none of the probabilities is larger than the predetermined threshold.

Next, in the process block 3512, a sorting device corresponding to the classification, or classifications, of the material piece may be activated. Between the time at which the image of the material piece was captured and the time at which the sorting device is activated, the material piece has moved from the proximity of the vision system and/or sensor system(s) to a location downstream on the conveyor system (e.g., at the rate of conveying of a conveyor system). In embodiments of the present disclosure, the activation of the sorting device is timed such that as the material piece passes the sorting device mapped to the classification of the material piece, the sorting device is activated, and the material piece is diverted/ejected from the conveyor system into its associated sorting bin. Within embodiments of the present disclosure, the activation of a sorting device may be timed by a respective position detector that detects when a material piece is passing before the sorting device and sends a signal to enable the activation of the sorting device. In the process block 3513, the sorting bin corresponding to the sorting device that was activated receives the diverted/ejected material piece.

FIG. 6 illustrates a flowchart diagram depicting exemplary embodiments of a process 400 of sorting material pieces in accordance with certain embodiments of the present disclosure. The process 400 may be configured to operate within any of the embodiments of the present disclosure described herein, including the system 100 of FIG. 1. The process 400 may be configured to operate in conjunction with the process 3500. For example, in accordance with certain embodiments of the present disclosure, the process blocks 403 and 404 may be incorporated in the process 3500 (e.g., operating in series or in parallel with the process blocks 3503-3510) in order to combine the efforts of a vision system 110 that is implemented in conjunction with a machine learning system with a sensor system (e.g., the sensor system 120) that is not implemented in conjunction with a machine learning system in order to classify and/or sort material pieces.

Operation of the process 400 may be performed by hardware and/or software, including within a computer system (e.g., computer system 3400 of FIG. 8) controlling the sorting system (e.g., the computer system 107 of FIG. 1). In the process block 401, the material pieces are fed onto a conveyor system. Next, in the optional process block 402, the material pieces may be conveyed along the conveyor system within proximity of a distance measuring device and/or an optical imaging system in order to determine a size and/or shape of the material pieces. In the process block 403, when a material piece has traveled in proximity of the sensor system, the material piece may be interrogated, or stimulated, with some type of energy appropriate for the particular type of sensor technology utilized by the sensor system (e.g., a LIBS system). In the process block 404, physical characteristics of the material piece are sensed/detected by the sensor system. In the process block 405, for at least some of the material pieces, the type of material is identified/classified based (at least in part) on the sensed/detected characteristics, which may be combined with the classification by the machine learning system in conjunction with the vision system 110.

Next, if sorting of the material pieces is to be performed, in the process block 406, a sorting device corresponding to the classification, or classifications, of the material piece is activated. Between the time at which the material piece was sensed and the time at which the sorting device is activated, the material piece has moved from the proximity of the sensor system to a location downstream on the conveyor system, at the rate of conveying of the conveyor system. In certain embodiments of the present disclosure, the activation of the sorting device is timed such that as the material piece passes the sorting device mapped to the classification of the material piece, the sorting device is activated, and the material piece is diverted/ejected from the conveyor system into its associated sorting bin. Within certain embodiments of the present disclosure, the activation of a sorting device may be timed by a respective position detector that detects when a material piece is passing before the sorting device and sends a signal to enable the activation of the sorting device. In the process block 407, the sorting bin corresponding to the sorting device that was activated receives the diverted/ejected material piece.

In accordance with certain embodiments of the present disclosure, a plurality of at least a portion of the system 100 may be linked together in succession in order to perform multiple iterations or layers of sorting. For example, when two or more systems 100 are linked in such a manner, the conveyor system may be implemented with a single conveyor belt, or multiple conveyor belts, conveying the material pieces past a first vision system (and, in accordance with certain embodiments, a sensor system) configured for sorting material pieces of a first set of a heterogeneous mixture of materials by a sorter (e.g., the first automation control system 108 and associated one or more sorting devices 126 . . . 129) into a first set of one or more receptacles (e.g., sorting bins 136 . . . 139), and then conveying the material pieces past a second vision system (and, in accordance with certain embodiments, another sensor system) configured for sorting material pieces of a second set of a heterogeneous mixture of materials by a second sorter into a second set of one or more sorting bins.

Such successions of systems 100 can contain any number of such systems linked together in such a manner. In accordance with certain embodiments of the present disclosure, each successive vision system may be configured to sort out a different material than previous vision system(s).

In accordance with various embodiments of the present disclosure, different types or classes of materials may be classified by different types of sensors each for use with a machine learning system, and combined to classify material pieces in a stream of scrap or waste.

In accordance with various embodiments of the present disclosure, data from two or more sensors can be combined using a single or multiple machine learning systems to perform classifications of material pieces.

In accordance with various embodiments of the present disclosure, multiple sensor systems can be mounted onto a single conveyor system, with each sensor system utilizing a different machine learning system. In accordance with various embodiments of the present disclosure, multiple sensor systems can be mounted onto different conveyor systems, with each sensor system utilizing a different machine learning system.

FIGS. 7A-7B illustrate a system and process 1600 configured in accordance with certain embodiments of the present disclosure in order to sort a plurality of metal alloy pieces. FIG. 7A illustrates an exemplary non-limiting schematic diagram of a side view of such a system and process 1600, while FIG. 7B illustrates a top view. Though FIGS. 7A-7B depict three stages of classification/sorting, any number of such stages may be implemented in accordance with various embodiments of the present disclosure.

A plurality of metal alloy pieces 1601 may be conveyed (e.g., by a conveyor belt 1602) to be picked up by an inclined conveyor system 1603. Note that the material pieces 1601 are not depicted in FIG. 7B for the sake of simplicity. The conveyor system 1603 conveys the material pieces 1601 past a sensor system 1610 in order to classify the material pieces for sorting. Any of the disclosed vision system 110 or sensor systems 120 (e.g., LIBS, XRF, etc.) may be utilized.

In a non-limiting example, the material pieces 1601 fed onto the conveyor system 1602 may be a mixture of aluminum alloys that include cast, wrought, and/or extruded aluminum alloys of various alloy compositions. An AI system 1610 may be configured to recognize, classify, and distinguish those material pieces composed of wrought aluminum alloy(s) from those composed of cast aluminum alloys. The conveyor system 1603 may be configured to operate at a sufficient speed in order to "throw" the material pieces classified as wrought aluminum alloy(s) onto a following inclined conveyor system 1604. Material pieces not classified as composed of wrought aluminum alloy(s) (e.g., cast and/or extruded alloys) are ejected by a sorting device 1620 onto a lower positioned conveyor system 1606. For example, such a sorting device 1620 may be an air jet nozzle such as described herein, which is actuated to eject a material piece not classified as wrought aluminum alloy(s) from the normal trajectory of material pieces being "thrown" from the end of the conveyor system 1603 onto the conveyor system 1604. The material pieces not classified as wrought aluminum alloy(s) (e.g., cast and/or extruded alloys) may be conveyed into a bin or receptacle 1630, or they may be conveyed past another sensor system 120 as disclosed herein.

The material pieces classified as wrought aluminum alloy(s) may be conveyed past an XRF or LIBS system 1611, which may be configured to identify, classify, and distinguish between different wrought aluminum alloy(s), including with a same wrought aluminum alloy series. The conveyor system 1604 may be configured to operate at a sufficient speed in order to "throw" the material pieces classified as belonging to one or more specific wrought aluminum alloys onto a following inclined conveyor system 1605. The other wrought aluminum alloy(s) may be ejected by a sorting device 1621 onto a lower positioned conveyor system 1607. For example, such a sorting device 1621 may be an air jet nozzle such as described herein, which is actuated to eject a material piece classified as belonging to one or more specific wrought aluminum alloy(s) from the normal trajectory of material pieces being "thrown" from the end of the conveyor system 1604 onto the conveyor system 1605. The classified material pieces may be conveyed into a bin or receptacle 1631.

The material pieces classified as belonging to the one or more specific wrought aluminum alloy(s) may be conveyed past a sensor system 1612, which may be configured to identify and classify those material pieces that contain a threshold amount of a specific material in order to classify a specific wrought aluminum alloy that is known to contain such a specific material.

In accordance with alternative embodiments of the present disclosure, the cast aluminum alloy(s) previously sorted out by the sorter 1620 may be conveyed by the conveyor system 1606 past an XRF system as described herein in order to classify/sort out certain specific cast alloy fractions. Cast aluminum alloy 319 has a single large copper peak observable in its XRF spectrum, cast aluminum alloy 356 does not have such a large copper peak, and cast aluminum alloy 380 has both large copper and zinc peaks. These large differences can be utilized by an XRF system to sort between these cast aluminum alloys with high accuracy. Classifying/sorting of cast fractions is further disclosed in U.S. Published Patent Application No. 2021/0229133, which is hereby incorporated by reference herein.

The conveyor systems 1605 and 1608 may be configured to operate in a similar manner as the conveyor systems 1603 and 1604, the sorter 1622 may be configured to operate in a similar manner as the sorters 1620, 1621, and the bins 1632, 1633 may be configured similarly as the bins 1630, 1631.

Note that the system and process 1600 is not limited to one line of conveyor systems, but may be expanded to multiple lines each ejecting classified material pieces onto multiple conveyor systems (e.g., conveyor systems 1606 . . . 1608). Likewise, one or more of the conveyor systems 1606 . . . 1608 may be implemented with any number of additional sensor systems to further classify those material pieces.

Furthermore, embodiments of the present disclosure are not limited to the sorting of aluminum alloys, but may be configured to sort any number of different classes of materials, including, but not limited to, the sorting of various metals (e.g., copper, brass, zinc, aluminum, etc.) from Zorba.

With reference now to FIG. 8, a block diagram illustrating a data processing ("computer") system 3400 is depicted in which aspects of embodiments of the disclosure may be implemented. (The terms "computer," "system," "computer system," and "data processing system" may be used interchangeably herein.) The computer system 107, the automation control system 108, aspects of the sensor system(s) 120, and/or the vision system 110 may be configured similarly as the computer system 3400. The computer system 3400 may employ a local bus 3405 (e.g., a peripheral component interconnect ("PCI") local bus architecture). Any suitable bus architecture may be utilized such as Accelerated Graphics Port ("AGP") and Industry Standard Architecture ("ISA"), among others. One or more processors 3415, volatile memory 3420, and non-volatile memory 3435 may be connected to the local bus 3405 (e.g., through a PCI Bridge (not shown)). An integrated memory controller and cache memory may be coupled to the one or more processors 3415. The one or more processors 3415 may include one or more central processor units and/or one or more graphics processor units and/or one or more tensor processing units. Additional connections to the local bus 3405 may be made through direct component interconnection or through add-in boards. In the depicted example, a communication (e.g., network (LAN)) adapter 3425, an I/O (e.g., small computer system interface ("SCSI") host bus) adapter 3430, and expansion bus interface (not shown) may be connected to the local bus 3405 by direct component connection. An audio adapter (not shown), a graphics adapter (not shown), and display adapter 3416 (coupled to a display 3440) may be connected to the local bus 3405 (e.g., by add-in boards inserted into expansion slots).

The user interface adapter 3412 may provide a connection for a keyboard 3413 and a mouse 3414, modem (not shown), and additional memory (not shown). The I/O adapter 3430 may provide a connection for a hard disk drive 3431, a tape drive 3432, and a CD-ROM drive (not shown).

An operating system may be run on the one or more processors 3415 and used to coordinate and provide control of various components within the computer system 3400. In FIG. 8, the operating system may be a commercially available operating system. An object-oriented programming system (e.g., Java, Python, etc.) may run in conjunction with the operating system and provide calls to the operating system from programs or programs (e.g., Java, Python, etc.) executing on the system 3400. Instructions for the operating system, the object-oriented operating system, and programs may be located on non-volatile memory 3435 storage devices, such as a hard disk drive 3431, and may be loaded into volatile memory 3420 for execution by the processor 3415.

Those of ordinary skill in the art will appreciate that the hardware in FIG. 8 may vary depending on the implementation. Other internal hardware or peripheral devices, such as flash ROM (or equivalent nonvolatile memory) or optical disk drives and the like, may be used in addition to or in place of the hardware depicted in FIG. 8. Also, any of the processes of the present disclosure may be applied to a multiprocessor computer system, or performed by a plurality of such systems 3400. For example, training of the vision system 110 may be performed by a first computer system 3400, while operation of the vision system 110 for sorting may be performed by a second computer system 3400.

As another example, the computer system 3400 may be a stand-alone system configured to be bootable without relying on some type of network communication interface, whether or not the computer system 3400 includes some type of network communication interface. As a further example, the computer system 3400 may be an embedded controller, which is configured with ROM and/or flash ROM providing non-volatile memory storing operating system files or user-generated data.

The depicted example in FIG. 8 and above-described examples are not meant to imply architectural limitations. Further, a computer program form of aspects of the present disclosure may reside on any computer readable storage medium (i.e., floppy disk, compact disk, hard disk, tape, ROM, RAM, etc.) used by a computer system.

As has been described herein, embodiments of the present disclosure may be implemented to perform the various functions described for identifying, tracking, classifying, and/or sorting material pieces. Such functionalities may be implemented within hardware and/or software, such as within one or more data processing systems (e.g., the data processing system 3400 of FIG. 8), such as the previously noted computer system 107, the vision system 110, aspects of the sensor system(s) 120, and/or the automation control system 108. Nevertheless, the functionalities described herein are not to be limited for implementation into any particular hardware/software platform.

As will be appreciated by one skilled in the art, aspects of the present disclosure may be embodied as a system, process, method, and/or program product. Accordingly, various aspects of the present disclosure may take the form of an entirely hardware embodiment, an entirely software embodiment (including firmware, resident software, micro-code, etc.), or embodiments combining software and hardware aspects, which may generally be referred to herein as a "circuit," "circuitry," "module," or "system." Furthermore, aspects of the present disclosure may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a random access memory ("RAM") (e.g., RAM 3420 of FIG. 8), a read-only memory ("ROM") (e.g., ROM 3435 of FIG. 8), an erasable programmable read-only memory ("EPROM" or flash memory), an optical fiber, a portable compact disc read-only memory ("CD-ROM"), an optical storage device, a magnetic storage device (e.g., hard drive 3431 of FIG. 8), or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flowchart and block diagrams in the figures illustrate architecture, functionality, and operation of possible implementations of systems, methods, processes, and program products according to various embodiments of the present disclosure. In this regard, each block in the flowcharts or block diagrams may represent a module, segment, or portion of code, which includes one or more executable program instructions for implementing the specified logical function (s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors (e.g., GPU 3401, CPU 3415) may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data (e.g., material classification libraries described herein) may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to one or more processors and/or controller(s) of a general purpose computer, special purpose computer, or other programmable data processing apparatus (e.g., controller) to produce a machine, such that the instructions, which execute via the processor(s) (e.g., GPU 3401, CPU 3415) of the computer or other programmable data processing apparatus, create circuitry or means for implementing the functions/acts specified in the flowchart and/or block diagram block or blocks.

It will also be noted that each block of the block diagrams and/or flowchart illustrations, and combinations of blocks in the block diagrams and/or flowchart illustrations, can be implemented by special purpose hardware-based systems (e.g., which may include one or more graphics processing units (e.g., GPU 3401)) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

Computer program code, i.e., instructions, for carrying out operations for aspects of the present disclosure may be written in any combination of one or more programming languages, including an object oriented programming language such as Java, Smalltalk, Python, C++, or the like, conventional procedural programming languages, such as the "C" programming language or similar programming languages, programming languages such as MATLAB or LabVIEW, or any of the machine learning software disclosed herein. The program code may execute entirely on the user's computer system, partly on the user's computer system, as a stand-alone software package, partly on the user's computer system (e.g., the computer system utilized for sorting) and partly on a remote computer system (e.g., the computer system utilized to train the machine learning system), or entirely on the remote computer system or server. In the latter scenario, the remote computer system may be connected to the user's computer system through any type of network, including a local area network ("LAN") or a wide area network ("WAN"), or the connection may be made to an external computer system (for example, through the Internet using an Internet Service Provider). As an example of the foregoing, various aspects of the present disclosure may be configured to execute on one or more of the computer system 107, automation control system 108, the vision system 110, and aspects of the sensor system(s) 120.

These program instructions may also be stored in a computer readable storage medium that can direct a computer system, other programmable data processing apparatus, controller, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present disclosure may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables.

Association of certain data (e.g., for each of the scrap pieces processed by a sorting system described herein) may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Reference is made herein to "configuring" a device or a device "configured to" perform some function. It should be understood that this may include selecting predefined logic blocks and logically associating them, such that they provide particular logic functions, which includes monitoring or control functions. It may also include programming computer software-based logic of a retrofit control device, wiring discrete hardware components, or a combination of any or all of the foregoing. Such configured devises are physically designed to perform the specified function or functions.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations may be not shown or described in detail to avoid obscuring aspects of the disclosure.

Reference throughout this specification to "an embodiment," "embodiments," or similar language means that a particular feature, structure, or characteristic described in connection with the embodiments is included in at least one embodiment of the present disclosure. Thus, appearances of the phrases "in one embodiment," "in an embodiment," "embodiments," "certain embodiments," "various embodiments," and similar language throughout this specification may, but do not necessarily, all refer to the same embodiment. Furthermore, the described features, structures, aspects, and/or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

Benefits, advantages, and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims. Further, no component described herein is required for the practice of the disclosure unless expressly described as essential or critical.

Those skilled in the art having read this disclosure will recognize that changes and modifications may be made to the embodiments without departing from the scope of the present disclosure. It should be appreciated that the particular implementations shown and described herein may be illustrative of the disclosure and its best mode and may be not intended to otherwise limit the scope of the present disclosure in any way. Other variations may be within the scope of the following claims.

While this specification contains many specifics, these should not be construed as limitations on the scope of the disclosure or of what can be claimed, but rather as descriptions of features specific to particular implementations of the disclosure. Headings herein may be not intended to limit the disclosure, embodiments of the disclosure or other matter disclosed under the headings.

Herein, the term "or" may be intended to be inclusive, wherein "A or B" includes A or B and also includes both A and B. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The terminology used herein is for the purpose of describing particular embodiments only and is not intended to be limiting of the disclosure. As used herein, the singular forms "a," "an," and "the" may be intended to include the plural forms as well, unless the context clearly indicates otherwise.

The corresponding structures, materials, acts, and equivalents of all means or step plus function elements in the claims below may be intended to include any structure, material, or act for performing the function in combination with other claimed elements as specifically claimed.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Unless defined otherwise, all technical and scientific terms (such as acronyms used for chemical elements within the periodic table) used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter. As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

What is claimed is:

1. A system for handling a first mixture of materials comprising a plurality of different classes of materials, the system comprising:

an image sensor configured to capture visually observed characteristics of each of the first mixture of materials; and a data processing system comprising a machine learning system implementing a neural network configured with a previously generated set of neural network parameters to classify a first plurality of materials of the first mixture as belonging to a first class of materials based solely on the captured visually observed characteristics, wherein the previously generated set of neural network parameters are uniquely associated with the first class of materials, wherein the plurality of materials of the first mixture classified as belonging to the first class of materials possess a chemical composition that is different from the materials within the first mixture not classified as belonging to the first class of materials.

2. The system as recited in claim 1, wherein the previously generated set of neural network parameters uniquely associated with the first class of materials were generated from captured visually observed characteristics of one or more samples of the first class of materials.

3. The system as recited in claim 1, wherein the first class of materials is cast aluminum alloys, the system further comprising:

a first sorter configured to sort the classified first plurality of materials of the first mixture from the first mixture as a function of the classifying of the first plurality of materials of the first mixture, wherein the sorting by the first sorter of the classified first plurality of materials of the first mixture from the first mixture produces a second mixture of materials that comprises the first mixture minus the classified first plurality of materials of the first mixture;

a Laser Induced Breakdown Spectroscopy ("LIBS") system configured to classify a second plurality of materials of the second mixture as belonging to a second class of materials; and a second sorter configured to sort the classified second plurality of materials of the second mixture from the second mixture as a function of the classifying of the second plurality of materials of the second mixture by the LIBS system, wherein the second mixture of materials comprises wrought aluminum material pieces containing a plurality of different wrought aluminum alloys, and wherein the LIBS system is configured to classify certain ones of the second mixture as belonging to a first wrought aluminum alloy, wherein the second sorter sorts the classified certain ones from the second mixture as a function of the classifying of certain ones of the second mixture, wherein the sorting by the second sorter of the classified certain ones from the second mixture produces a third mixture of materials that comprises the second mixture minus the certain ones from the second mixture, wherein the third mixture comprises materials belonging to a second wrought aluminum alloy different from the first wrought aluminum alloy.

4. The system as recited in claim 1, wherein the first class of materials is cast aluminum alloys, the system further comprising:

a first sorter configured to sort the classified first plurality of materials of the first mixture from the first mixture as a function of the classifying of the first plurality of materials of the first mixture;

an x-ray fluorescence ("XRF") system configured to classify a second plurality of materials of the classified first plurality of materials as belonging to a second class of materials as a function of spectral data produced by the XRF system; and a second sorter configured to sort the classified second plurality of materials from the classified first plurality of materials as a function of the classifying of the second plurality of materials by the XRF system.

5. The system as recited in claim 1, wherein the previously generated set of neural network parameters were produced in a training stage in which an artificial intelligence system implementing a neural network processed visual images of a control set of materials representing the first class of materials.

6. A method for handling a first heterogeneous mixture of separable materials comprising a plurality of different types of materials, the method comprising:

capturing visually observed characteristics of each material piece of the first heterogeneous mixture of materials with a camera;

assigning, with an artificial intelligence system implementing a neural network configured with a previously generated set of neural network parameters, a first classification to certain ones of the first heterogeneous mixture of materials as belonging to a first type of materials based solely on the captured characteristics of each material piece of the first heterogeneous mixture of materials, wherein the previously generated set of neural network parameters are uniquely associated with the first type of materials; and sorting the certain ones of the first heterogeneous mixture of materials from the first heterogeneous mixture as a function of the first classification, wherein the sorting produces a second heterogeneous mixture of materials that comprises the first heterogeneous mixture of materials minus the sorted certain ones of the first heterogeneous mixture of materials.

7. The method as recited in claim 6, wherein the previously generated set of neural network parameters were produced from a previously generated classification of a control sample of the first type of materials.

8. The method as recited in claim 6, further comprising:

assigning with a LIBS system a second classification to certain ones of the second heterogeneous mixture of materials as belonging to a second type of materials; and sorting the certain ones of the second heterogeneous mixture of materials from the second heterogeneous mixture as a function of the second classification.

9. The method as recited in claim 8, wherein the first classification of materials is cast aluminum alloys, wherein the second heterogeneous mixture of materials comprises wrought aluminum material pieces containing a plurality of different wrought aluminum alloys, and wherein the LIBS system is configured to classify certain ones of the second heterogeneous mixture as belonging to a first wrought aluminum alloy, wherein a sorter sorts the classified certain ones of the second heterogeneous mixture as a function of the classifying of certain ones of the second heterogeneous mixture.

10. The method as recited in claim 9, wherein the sorting by the sorter of the classified certain ones of the second heterogeneous mixture produces a third mixture of materials that comprises the second heterogeneous mixture minus the certain ones of the second heterogeneous mixture, wherein the third mixture comprises materials belonging to a second wrought aluminum alloy different from the first wrought aluminum alloy.

11. The method as recited in claim 8, wherein the second heterogeneous mixture of materials comprises metal cast alloys.

12. The method as recited in claim 6, further comprising:

assigning with an XRF system a second classification to certain ones of the second heterogeneous mixture of materials as belonging to a second type of materials as a function of spectral data produced by the XRF system; and sorting the certain ones of the second heterogeneous mixture of materials from the second heterogeneous mixture as a function of the second classification.

13. The method as recited in claim 12, wherein the first classification of materials is cast aluminum alloys.

14. The method as recited in claim 12, wherein the second heterogeneous mixture of materials comprises metal cast alloys.

15. The method as recited in claim 6, wherein the previously generated set of neural network parameters were produced in a training stage in which an artificial intelligence system implementing a neural network processed visual images of a control set of materials representing the first class of materials.

* * * * *